(12) United States Patent
Fink et al.

(10) Patent No.: US 12,480,590 B2
(45) Date of Patent: Nov. 25, 2025

(54) VALVES AND CONTROL SYSTEMS FOR CLEAN FLUID PRESSURE EQUALIZATION AND DE-ENERGIZATION

(71) Applicant: The E3 Company LLC, Meadville, PA (US)

(72) Inventors: Daniel Fink, Porter, TX (US); Clayton Dale, Townville, PA (US)

(73) Assignee: The E3 Company LLC, Meadville, PA (US)

( * ) Notice: Subject to any disclaimer, the term of this patent is extended or adjusted under 35 U.S.C. 154(b) by 178 days.

(21) Appl. No.: 18/273,530

(22) PCT Filed: Jan. 21, 2022

(86) PCT No.: PCT/US2022/013397
§ 371 (c)(1),
(2) Date: Jul. 20, 2023

(87) PCT Pub. No.: WO2022/159759
PCT Pub. Date: Jul. 28, 2022

(65) Prior Publication Data
US 2024/0125401 A1  Apr. 18, 2024

Related U.S. Application Data

(60) Provisional application No. 63/140,080, filed on Jan. 21, 2021.

(51) Int. Cl.
*F16K 17/34* (2006.01)
*F16K 17/08* (2006.01)
(Continued)

(52) U.S. Cl.
CPC ............ *F16K 17/34* (2013.01); *F16K 17/082* (2013.01); *F16K 17/30* (2013.01); *F16K 47/14* (2013.01);
(Continued)

(58) Field of Classification Search
CPC . Y10T 137/7727; G05D 16/204; F16L 47/08; F16K 5/06; F16K 5/10;
(Continued)

(56) References Cited

U.S. PATENT DOCUMENTS 2,734,342 A * 2/1956 Mallory .................. B60T 11/32
137/460
2,810,607 A * 10/1957 Hruby, Jr. ................. B05B 1/30
239/206

(Continued)

FOREIGN PATENT DOCUMENTS

WO   WO-2020252466 A1 * 12/2020  ............... F16K 1/52

*Primary Examiner* — Jessica Cahill
(74) *Attorney, Agent, or Firm* — Blank Rome LLP

(57) ABSTRACT

A pressure control system configured to respond to high-pressure conditions in a fluid conduit is disclosed. The system generally includes first and second flow restrictors positionable inline on a fluid conduit and configured to block fluid flow in the conduit and respond to a high-pressure event to allow fluid flow therethrough. The first flow restrictor is position upstream from the second flow restrictor and may open to allow fluid flow in response to the high-pressure event. The second flow restrictor provides adjustable flow of fluid therethrough or may open a bypass line in response to the high-pressure event to allow unrestricted fluid flow therethrough.

20 Claims, 30 Drawing Sheets

(51) Int. Cl.
*F16K 17/30* (2006.01)
*F16K 47/14* (2006.01)

(52) U.S. Cl.
CPC .. *F16K 2200/201* (2021.08); *F16K 2200/304* (2021.08)

(58) Field of Classification Search
CPC .... F16K 47/16; F16K 47/14; F16K 2200/304; F16K 2200/201; F16K 17/34; F16K 17/082; F16K 17/30; E21B 34/00; E21B 43/2607
See application file for complete search history.

(56) References Cited

U.S. PATENT DOCUMENTS

| | | | | |
|---|---|---|---|---|
| 5,988,586 | A * | 11/1999 | Boger | F16K 47/08 138/44 |
| 7,178,782 | B1 * | 2/2007 | York | F16K 5/12 137/625.3 |
| 12,019,459 | B2 * | 6/2024 | Fink | F16K 47/08 |
| 2004/0031523 | A1 * | 2/2004 | Zeng | F16K 31/1635 137/460 |
| 2007/0235087 | A1 * | 10/2007 | Brent Gilbertson | E03D 1/00 137/460 |
| 2017/0184218 | A1 * | 6/2017 | Bey | F16K 47/16 |
| 2018/0010421 | A1 * | 1/2018 | Quin | F16K 47/08 |
| 2018/0259080 | A1 * | 9/2018 | Dale | E21B 41/0021 |
| 2020/0248838 | A1 * | 8/2020 | Anandbabu | F16L 58/00 |

* cited by examiner

VALVES AND CONTROL SYSTEMS FOR CLEAN FLUID PRESSURE EQUALIZATION AND DE-ENERGIZATION

CROSS-REFERENCE TO RELATED APPLICATIONS

The present application is a U.S. national stage filing under 35 U.S.C. § 371 of International Application No. PCT/US2022/013397, filed on Jan. 21, 2022, which claims the benefit of priority under 35 U.S.C. § 119 (e) of prior U.S. Provisional Application Ser. No. 63/140,080, filed Jan. 21, 2021, the entire content of which is incorporated herein by reference in their entirety.

TECHNICAL FIELD

The present disclosure relates generally to systems and methods for pressure adjustment or control in fluid pipelines, and more specifically to flow restrictors responsive to high-pressure events and configured to provide adjustable bleed-down of fluid conduits and pressure equalization.

BACKGROUND

Fluid lines under high pressure (e.g., pressure vessels and piping systems) are often designed with control valves to block or meter fluid flow from certain areas in an open or closed loop system. These pressure logic valves are generally manually operated or actuated devices set to adjust to a specified pressure level (set-point), allowing fluid to move in the system from an area of higher pressure to an area of lower pressure, e.g., direct acting check valves, ball trim valves, and plug-type trim valves. Other solutions for pressure control attempt to electronically control the physical position of a rather standard valve, thus creating a calculated orifice size based on a partial open or closed status of the sealing components. These solutions, however, use expensive valves requiring hydraulics and actuators. Alternatively, simpler pop-off valves provide non-adjustable pressure-relief but must be replaced after only a few uses and are not easily resealed to equalize pressure.

Accordingly, it would be desirable to have a simple system configured to respond to high-pressure events that acts as either or both of an adjustable valve and a simple pop-off valve.

SUMMARY

The present disclosure provides the aforementioned benefits by providing systems, devices, and methods for pressure control in fluid conduits.

Provided herein is a flow restrictor system for pressure relief in a fluid conduit, the system comprising a first non-adjustable flow restrictor and a second adjustable flow restrictor, configured to be positioned inline on a fluid conduit. The first flow restrictor comprises a sleeve having an inlet end, an outlet end, and a longitudinal bore therebetween, an insert positioned within the longitudinal bore and sealed against an inner wall thereof, the insert comprising a plurality of longitudinal perforations that provide fluid passage through the longitudinal bore, and a plurality of ports positioned radially through the sleeve, each port in fluid communication with one of the plurality of longitudinal perforations, wherein each port comprises an adjustable plunger configured to move within the port to adjustably restrict fluid flow through the longitudinal perforation, and wherein the insert comprises a bypass port configured to provide fluid flow that bypasses the plurality of longitudinal perforations, the bypass port maintained in a closed position by a piston. The second flow restrictor comprises a sleeve having an inlet end, an outlet end, and a longitudinal bore therebetween, an insert positioned within the longitudinal bore and sealed against an inner wall thereof, the insert comprising a plurality of longitudinal perforations that provide fluid passage through the longitudinal bore, wherein the insert comprises a piston configured to restrict flow of fluid through the longitudinal bore of the second flow restrictor when in a closed position.

According to the present disclosure, the inlet end of the first flow restrictor is connectable to the outlet end of the second flow restrictor, and wherein the flow restrictor system is connectable inline on the fluid conduit. According to the present disclosure, the flow restrictor system is positioned on the fluid conduit such that fluid flow is from the inlet end of the second flow restrictor to the outlet end of the first flow restrictor. In either case, the piston of the first and second flow restrictors may be maintained in the closed position by an actuation fluid. Moreover, the piston of either or both of the first and second flow restrictor may open responsive of a high-pressure condition.

According to the present disclosure, the system further comprises a pressure sensor configured to detect a fluid pressure in the fluid conduit. The piston of either or both of the first and second flow restrictor may open responsive of an electronic signal indicating a high-pressure condition in the fluid conduit, wherein the electronic signal is received from the pressure sensor. The pressure sensor may comprise more than one pressure transducer, such as at least two pressure transducers.

According to the present disclosure, the insert of either or both of the first and second flow restrictors comprises an outer sleeve that seals the insert against the inner wall of the flow restrictor, and wherein the piston is positioned within the outer sleeve and maintained therein by a stop removeably positioned within the outer sleeve. The plurality of longitudinal perforations may be positioned within the outer sleeve of the insert.

According to the present disclosure, the insert of the first flow restrictor comprises an outer sleeve that seals the insert against the inner wall of the flow restrictor, and wherein the piston is positioned within the outer sleeve and maintained therein by a stop removeably positioned within the outer sleeve such that the actuation fluid fills a gap between the piston and the stop and forces the piston to close over the bypass port.

According to the present disclosure, any or all of the adjustable plungers and the piston of the first flow restrictor may be automatically adjustable by a hydraulic actuator.

According to the present disclosure, the adjustable plunger rotates within a bonnet to adjust a fluid flow rate through the longitudinal perforation, and the bonnet and plunger are maintained in the port by a locking nut.

According to the present disclosure, each of the plurality of ports of the first flow restrictor is positioned in a section of the longitudinal bore having a reduced diameter.

According to the present disclosure, wherein each of the first and second flow restrictor comprises a section of the longitudinal bore that is distal from the inlet end and comprises a reduced diameter, wherein an end of the reduced diameter section is sealable by the piston.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present disclosure, unless stated to be otherwise, are not necessarily drawn to scale. The illustrative embodiments in the following drawings are not meant to be limiting; other embodiments may be utilized and other changes may be made without departing from the spirit or scope of the subject matter presented herein.

FIGS. 8A and 8B illustrate another pressure sensor system in accordance with certain aspects of the present disclosure, wherein FIG. 8A shows a pressure bladder bonded within an inner bore of the pressure sensor and FIG. 8B shows the pressure bladder held in place with a c-ring.

DETAILED DESCRIPTION

Figure 1:
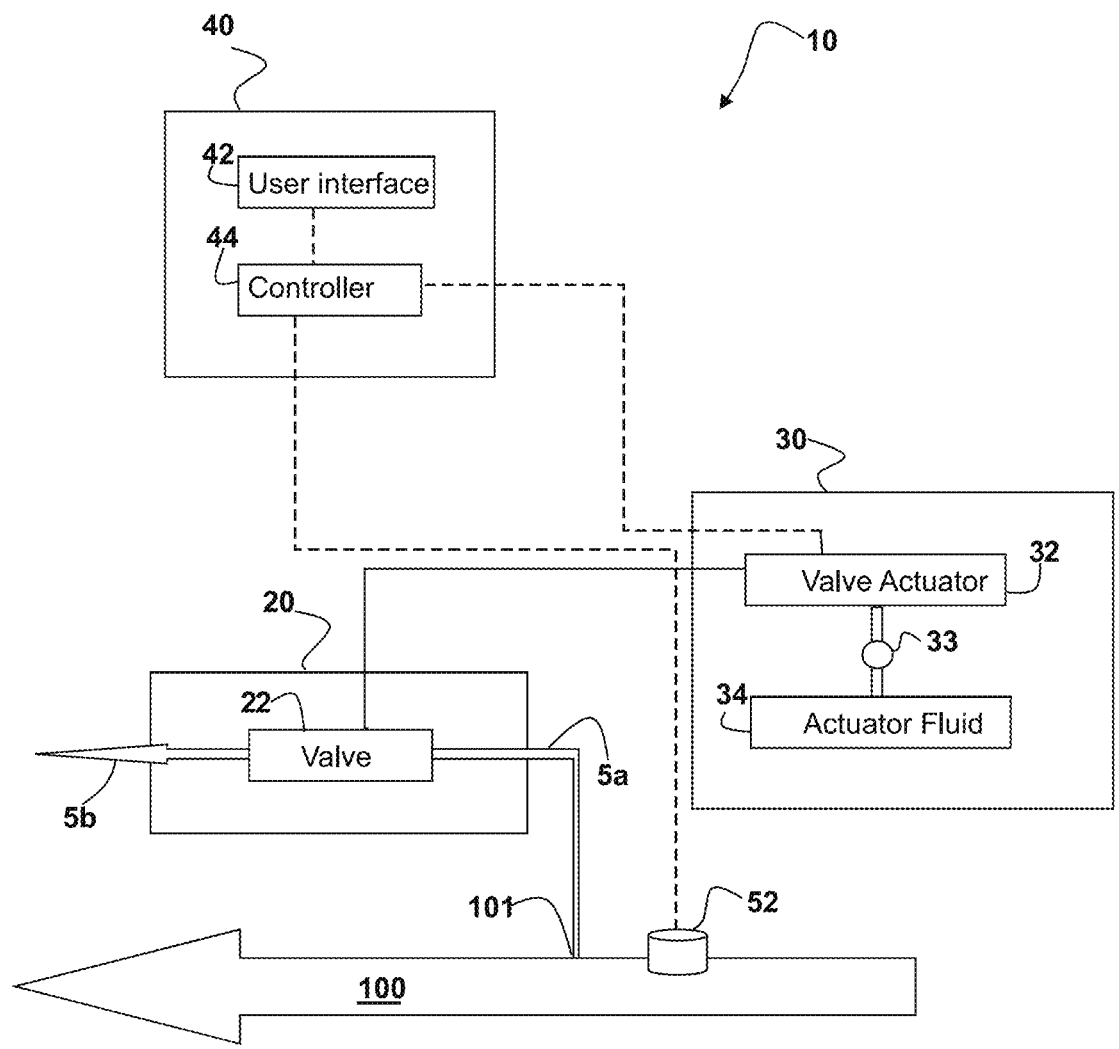
FIG. 1 illustrates a block diagram of a valve system in accordance with certain aspects of the present disclosure.

In the following description, the present disclosure involves systems and methods for adjustment and control of pressure conditions in fluid lines. The above summary and drawings are not intended to describe or show each illustrated embodiment or every possible implementation of the presently disclosed systems and methods. Rather, various aspects of the systems and methods disclosed herein are described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described component, event, or circumstance may or may not occur, and that the description includes instances where the event occurs and instances where it does not. In addition, the word "comprising" as used herein means "including, but not limited to".

Various aspects of the systems disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the systems in addition to the orientation depicted in the drawings. By way of example, if aspects of a valve shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made herein to "a" valve, "an" actuator, or "the" user interface, one or more of any of these components and/or any other components described herein can be used.

"Substantially," as used herein, is understood to mean to a great or significant extent, such as at least 80%, or 90%, or 95%, 96%, 97%, 98%, or even 99%. For example, when an object is described as having a property substantially the same as a comparative such as a diameter or shape, etc., the property will be within at least 80% of the value of the comparative.

Unless defined otherwise, all technical and scientific terms used herein have the same meanings as commonly understood by one of ordinary skill in the art.

The present disclosure provides valve assemblies, fluid restrictors, and control systems that afford effective pressure adjustment, control, and/or relief in fluid lines or conduits, such as those used in the hydraulic fracturing industry, in wellbore completion activities, and according to certain embodiments, for clean fluid conduits.

The valve assemblies disclosed herein include individually controllable valves and associated actuators, and unique valve designs that maintain the sealing face of the valve out of contact with the abrasive fluid flow. Similarly, the flow restrictors disclosed herein are adjustable and responsive to high-pressure events. As such, any of these assemblies may be placed in-line on a fluid conduit, such as a bypass conduit, and thus alleviate the problems associated with 90-degree valves (e.g., valves placed at right angles on high-pressure conduits).

The systems and methods of the present disclosure are novel when compared with other known systems and controlled pressure loss solutions in that they provide at least two independently controlled valves that may monitor and adjust pressure conditions in the same or separate fluid lines, all in a convenient assembly having redundant sensors and controls to afford fail-resistant operation. The systems of the present disclosure are novel over prior art solutions in the overall system architecture, which provide a specific combination of elements that afford greater performance attributes to the valve assemblies, improved integration with current wellbore activities, enhanced designs for the valves and actuators, and better electronic control over the process and the data derived therefrom. Furthermore, the systems of the present disclosure place the valve assembly parallel with the fluid flow path and provide unique valve internal geometry and materials selection that combat the harsh fluid environment during the adjustment and/or rapid pressure loss event (i.e., when the valve is open).

Referring now to the drawings, systems and methods according to the present disclosure are shown in FIGS. 1-26. Like reference numbers are used to label similar or shared components in each of the figures. As such, reference to a component depicted in one figure, such as the pressure sensor 52 of FIG. 1, may also include reference to the pressure sensor and included components (52-58) in FIG. 7, and vice versa. As another example, reference to a valve 22 in FIG. 1 may also be reference to a first valve and a second valve (22a and 22b, respectively) in FIG. 4.

With reference to FIG. 1, a system 10 of the present disclosure includes a valve assembly 20, a valve actuation system 30, and a control system 40 configurable to execute a user defined control process. The system may include two or more valve assemblies 20 each comprising a valve 22 therein, such as a ball valve, wherein each valve 22 is individually regulatable such as via a valve actuation system 30. The valve actuation system 30 may include a source of actuation fluid 34, such as a gas or hydraulic fluid, and a drive means configured to open/close the associated valve, e.g., ball valve, such as an actuator 32 and a pump 33.

According to certain aspects of the present disclosure, the actuator 32 may be a linear or rotary actuator, or an actuator that comprises a combined rotary and linear movement, e.g., scotch yoke, crank/slider, rack and pinion. The actuator 32 may be mechanically coupled to the valve 22, wherein movement of the actuator changes the valve position. The actuator 32 may be assisted by a pump 33 which forces the actuator fluid 34 into a chamber of the actuator to provide counterforce, such as against a spring or piston.

The control system 40 generally includes a user interface 42, and a controller 44 including a processor and a memory. The control system 40 may be in communication with a pressure sensing device 52 and the valve actuation system 30 (electrical communications shown as dotted lines in FIG. 1) to provide electronic control over the opening and closing of the valve 22.

During oil and gas operations, fluids are pumped at high pressures through various conduits. For example, during hydraulic fracturing operations, fluids are injected at high pressures through a wellbore into deep underground hydrocarbon formations. As a precursor to these fracturing operations, these conduits are pressure tested at significant pressures, i.e., at pressure often exceeding 10,000 psi. After a pressure test, the pressure in these conduits must be reduced or equalized to the pressures in the rest of the system, e.g., pressures in the wellbore. Prior art systems used for these activities generally require manual operation of a valve to slowly adjust the pressure in the lines by partially opening the valve. This not only places a human operator in harm's way, but also positions sealing faces of the valve in-line with the fluid flow, which frequently contains particulates. As discussed above, the abrasive fluid flow on the sealing face of the valve will reduce its sealing capabilities over time, and lead to the need for replacement of parts.

Moreover, during normal operation, high pressure pumps force fluid through these conduits into the wellbore for fracturing activities. In the event that a conduit becomes obstructed, an overpressure condition will develop within the conduits until the pumps are shut down, or until catastrophic failure occurs. As such, pressure relief valves are generally included on these conduits to provide a quick relief of these dangerous overpressure events. Typical prior art relief valves are either one-time use valves, or include valves that position sealing faces of the valve in-line with the fluid flow.

The systems and methods of the present disclosure improve upon the prior art valves discussed above by placing the valve in a bypass conduit (5a, 5b) downstream from a connection 101 with a high-pressure fluid conduit, i.e., main conduit 100. This allows the valve 22 to be placed 180° with respect to the fluid flow, i.e., the open valve is parallel with the fluid flow, whereas the prior art valves were positioned at 90° to the fluid flow, i.e., the valve assembly was perpendicular to the fluid flow.

Figure 2:
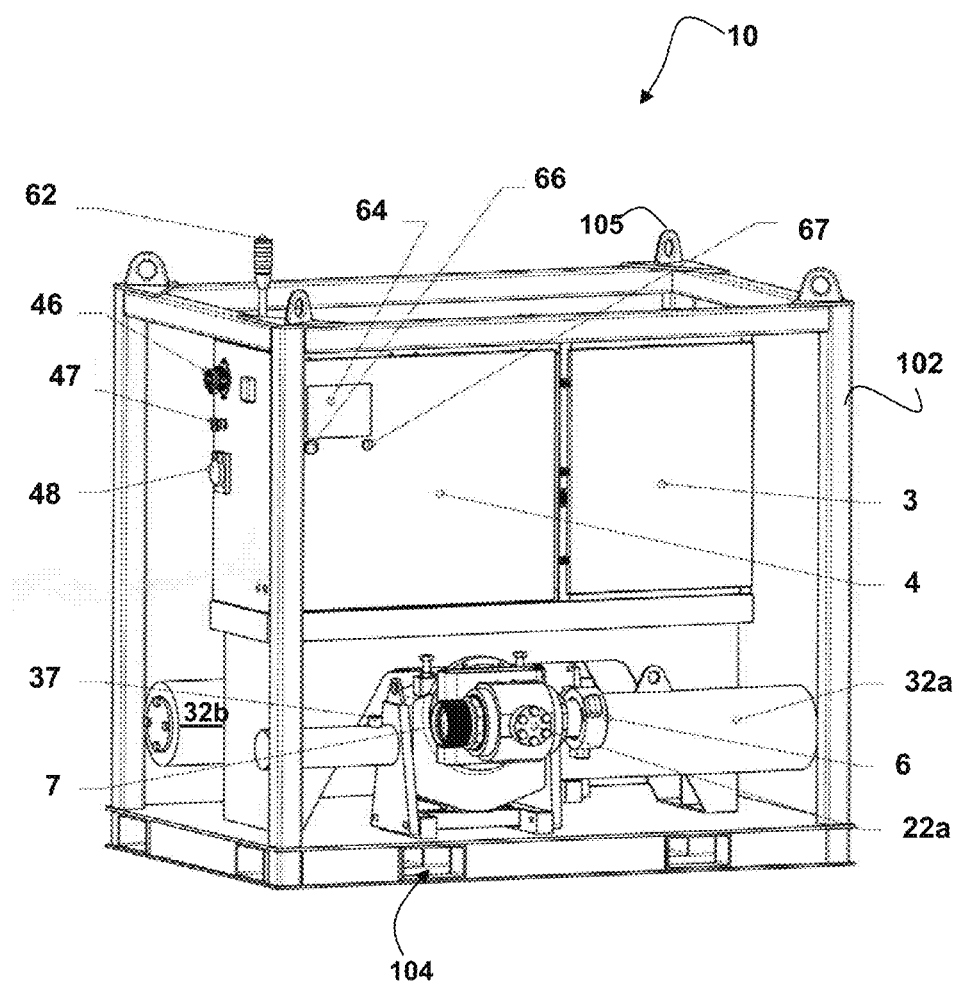
FIG. 2 illustrates a perspective view of a valve system comprising two valves in accordance with certain aspects of the present disclosure.

With reference to FIG. 2, an exemplary system 10 of the present disclosure is shown. The system 10 includes at least two valve assemblies and associated valve actuation systems. Shown in FIG. 2 is a right side perspective view of a frame 102 which contains a hydraulics enclosure 3 containing at least the valve actuation fluid 34 and pump 33. Also shown is an electronic control enclosure 4 which generally contains the power management system, and may further contain portions of the control system. Certain power management system components may be positioned on an outside face of the electronic control enclosure 4 so that they may be easily accessible by a user. For example, exemplary components include a power disconnect 46, remote override input 47, and charging input connections 48. Furthermore, a local screen display 64, a voltmeter 66, a charging indicator lamp(s) 67, and an indicator light stack 62 may also be included on the electronic control enclosure 4.

The system 10 may include at least two valve assemblies 20, each containing a valve 22 (shown in FIG. 2 is a first valve 22a), wherein the valve assemblies 20 includes an upstream connection point 6 and a downstream connection point 7. In use, the system 10 may be placed in close proximity to a main conduit 100. One end of a first bypass conduit (see 5a of FIG. 1) may be attached to the main conduit 100 at a connection 101, and the other end may be attached to the upstream connection point 6 of the valve assemblies 20. A second bypass conduit (see 5b of FIG. 1) may be attached to the downstream connection point 7 of the valve assemblies 20, and the other end may be placed in a collection reservoir. Exemplary collection reservoirs include at least an earthen pit, a collection pool, a tank, a portable tank such as on a truck, e.g., frac tank, etc.

The system 10 also includes a valve actuation system 30 to actuate (i.e., open and/or close) each valve 22. As shown in FIG. 2, the valve actuation systems may be positioned in close association with the valves 22 within the frame 102 (i.e., valve 22a may be actuated by actuator 32a; valve 22b may be actuated by actuator 32b). Actuation of the valves by the valve actuation system 30 may be triggered by a pressure event in the main conduit 100 detected by a pressure sensor 50 (see for example FIG. 7).

Figure 3:
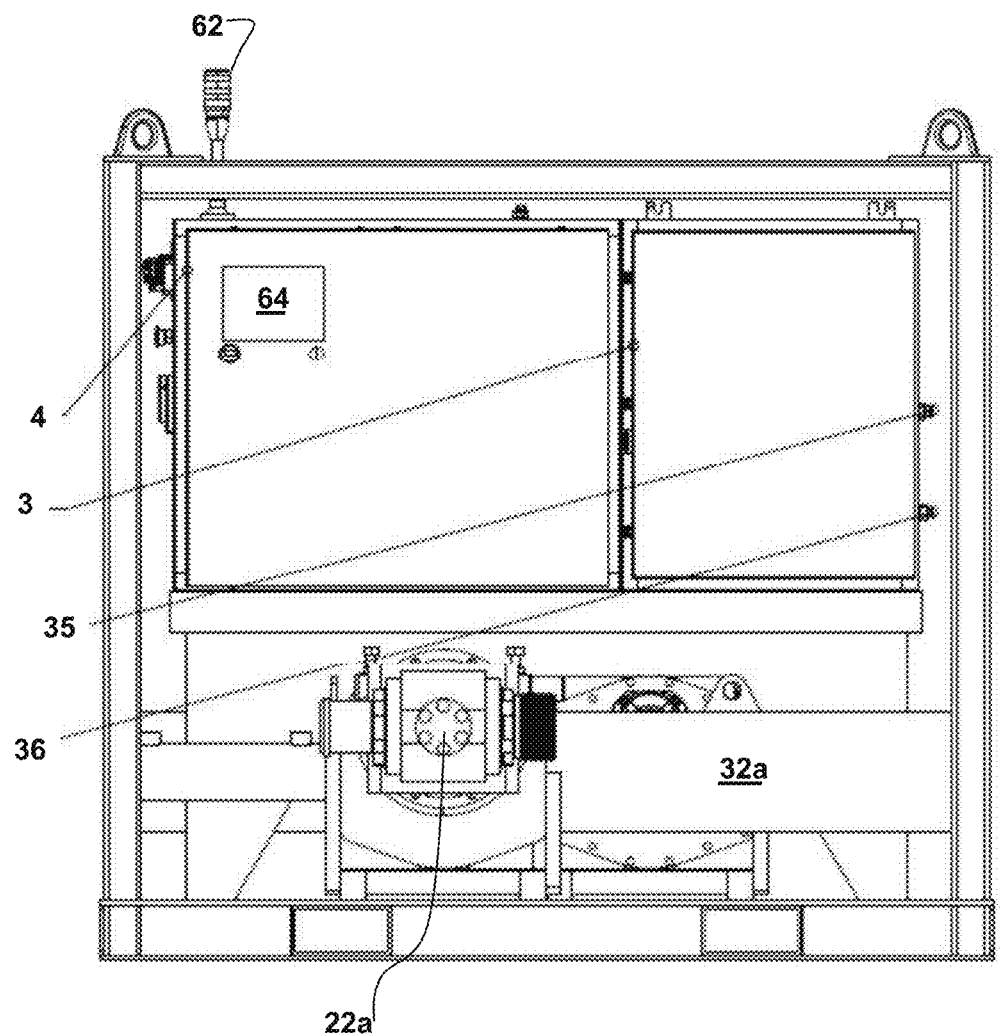
FIG. 3 illustrates a side view of the valve system shown in FIG. 2.

As shown in FIG. 3, the system 10 also includes a pressure input port 36 and a hydraulic output port 35 on the hydraulics enclosure 3. The pressure input port 36 may connect to a pressure sensor 52, as discussed in more detail below. As shown in FIG. 1, the pressure sensor 52 may be placed on a main conduit 100 or a bypass conduit 5. The hydraulic output port 35 may provide connection for a fluid line that may pass the hydraulic fluid in a hydraulic fluid reservoir 34 positioned in the hydraulics enclosure 3 to the valve actuator 32 via a connection point 37 thereon (see FIG. 2). The indicator light stack 62, valve 22, and valve actuator 32 are labeled for reference. While actuation of the valve is discussed in connection with a hydraulic fluid, the actuator fluid 34 (as referenced in FIG. 1) could also include compressed gas.

Figure 4:
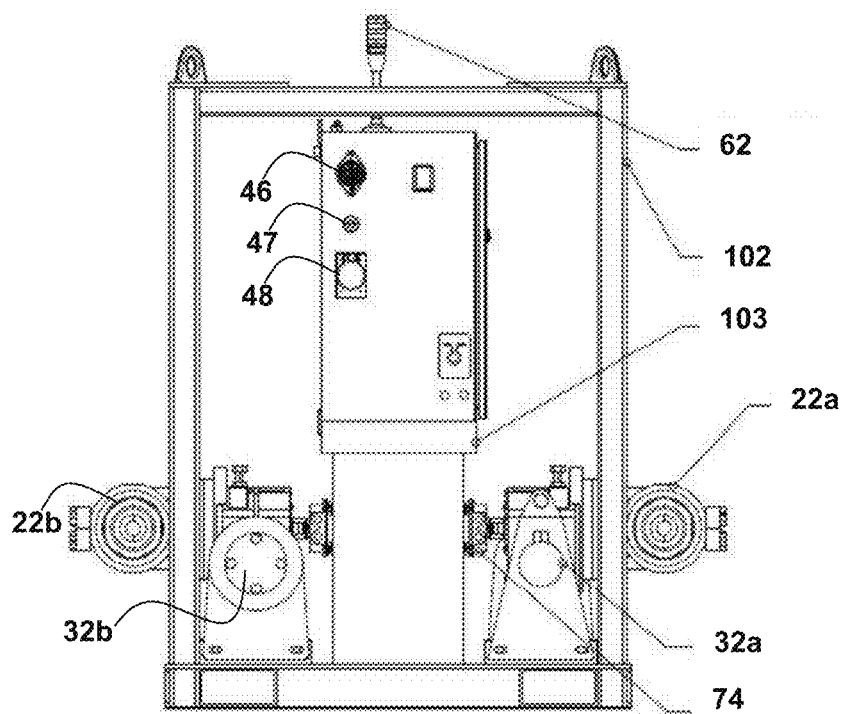
FIG. 4 illustrates a front view of the valve system shown in FIG. 2.

A front view of the system 10 is shown in FIG. 4. Both valves (22a and 22b) and valve actuation systems (32a and 32b) are visible, as well as a case 103 that houses the hydraulics enclosure 3 and the electronic control enclosure 4.

Figure 5:
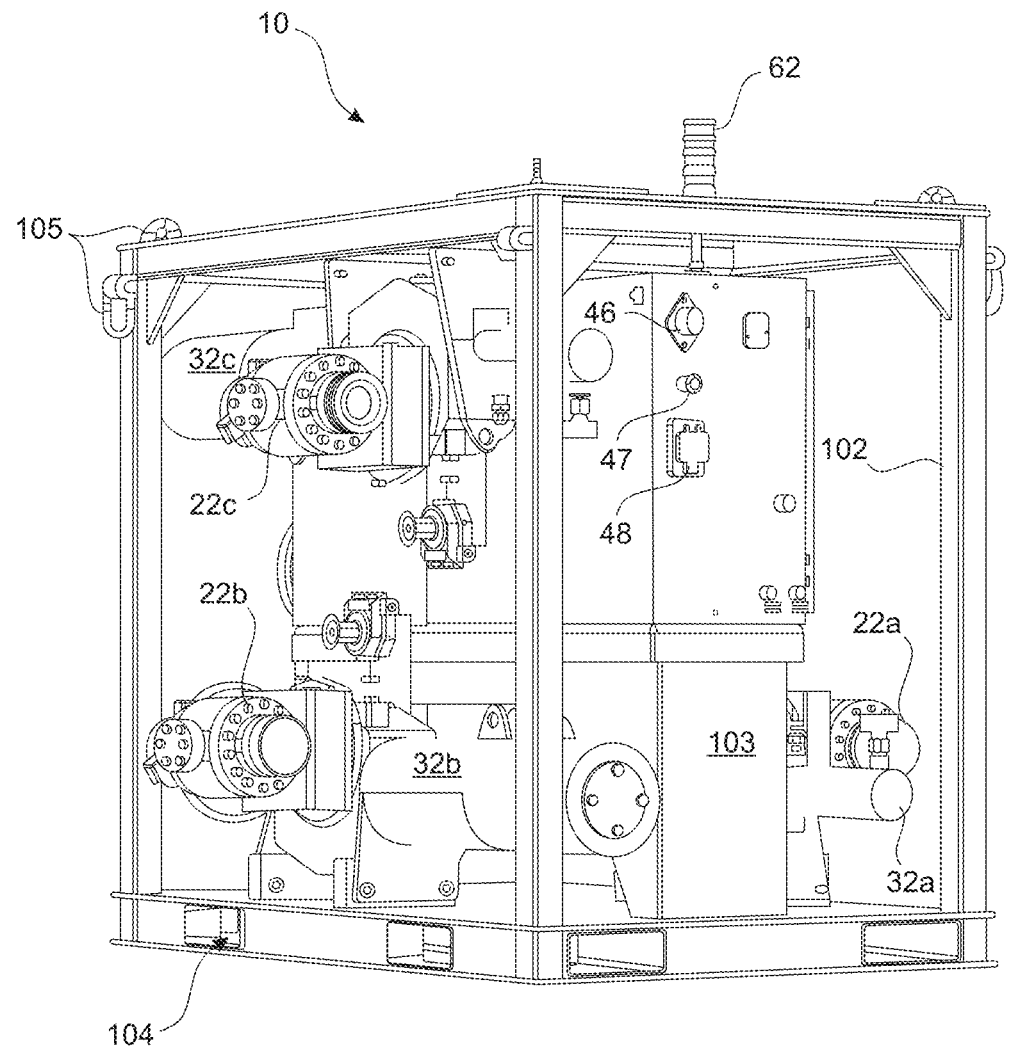
FIG. 5 illustrates a perspective view of a valve system comprising three valves in accordance with certain aspects of the present disclosure.

With reference to FIG. 5, a system 10 comprising three valve assemblies 20 is shown. Each valve assembly 20 comprises a valve (22a, 22b, 22c) and valve actuation (32a, 32b, 32c) housed within the frame 102. As also shown in FIGS. 2-4, the system 10 of FIG. 5 comprises a case 103 that houses a hydraulics enclosure and an electronic control enclosure, the latter of which may include power disconnect 46, remote override input 47, and charging input 48 connections in addition to other components (e.g., indicator light stack 62, valve position sensor, pressure input port, a hydraulic output port, etc.).

Also shown in FIGS. 2 and 5 are connection points on the system 10 that may assist in moving or placing the system at a job site. According to certain aspects, the system 10 may have an overall weight exceeding several thousand pounds, and an overall size exceeding 35 ft$^3$. As such, heavy rigging and/or a forklift are commonly used to move the system 10 to or from a worksite. For example, attachment rings 105 or other connection points may be positioned on an upper surface or area of the frame 102 that are configured for attachment of rigging hooks for lifting the system 10 via a crane. Additionally, or alternatively, slots 104 may be positioned in a bottom portion of the frame 102 that are configured to provide insertion regions for the blades of a forklift. According to certain aspects, these slots 104 could also be positioned on a top of the frame 102. This latter positioning may be favored for systems positioned at work sites having soft ground, wherein slots 104 on a bottom region of the frame 102 could sink into the ground surface and become occluded.

Figure 6A:
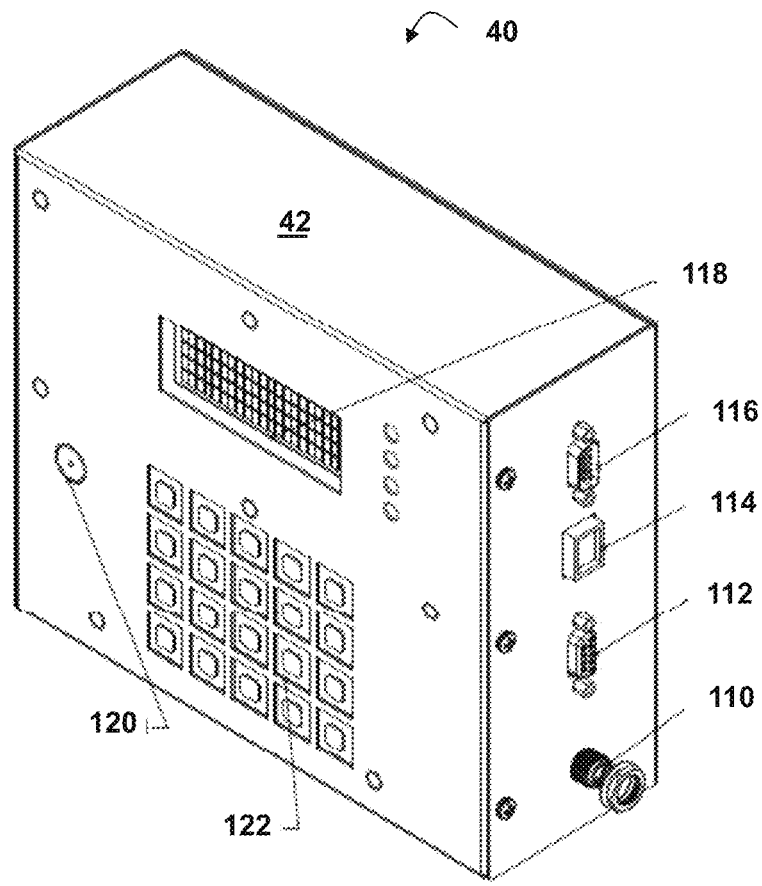
FIG. 6A illustrates a remote user interface assembly in accordance with certain aspects of the present disclosure.
Figure 6B:
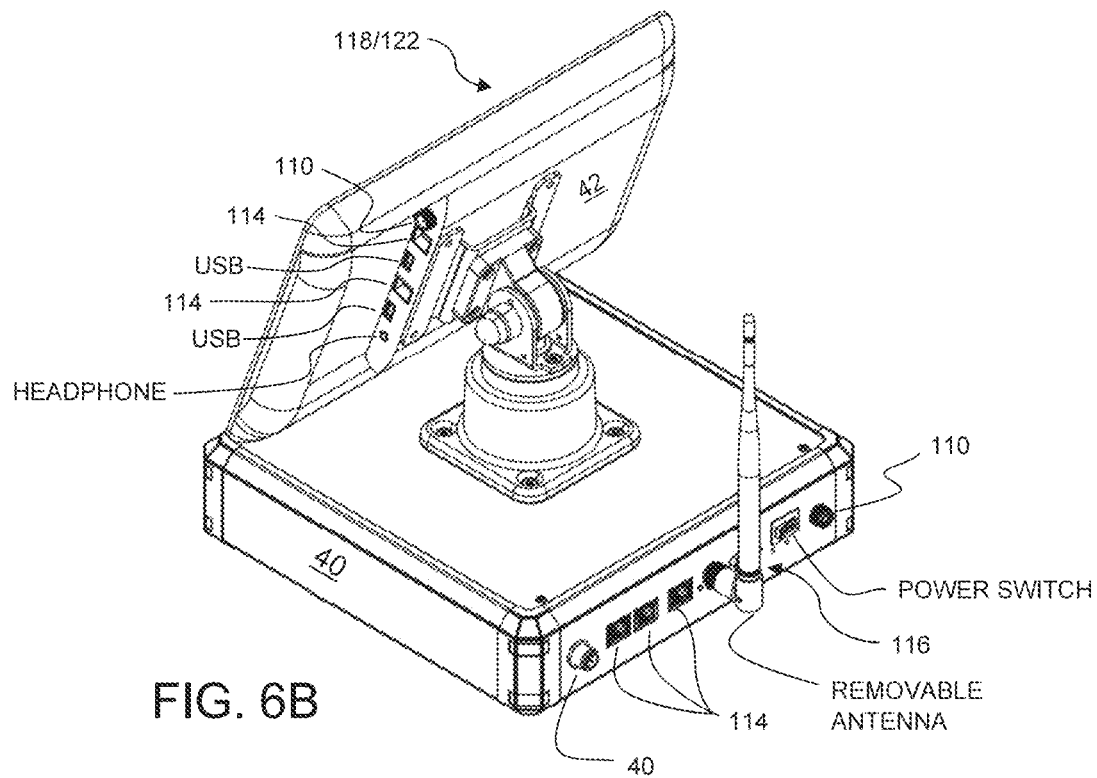
FIG. 6B illustrates a rear perspective view of a user interface assembly in accordance with certain aspects of the present disclosure.
Figure 6C:
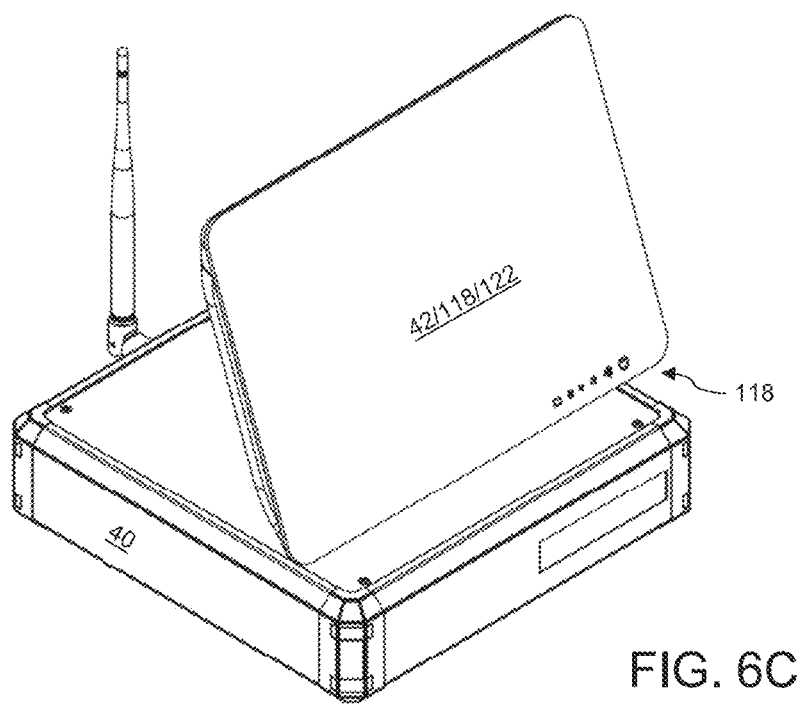
FIG. 6C illustrates a front perspective view of a user interface assembly in accordance with certain aspects of the present disclosure.

With reference to FIG. 4, the case 103 may provide attachment for a user interface 42 portion of a control system 40 (see FIGS. 6A-6C). Each of the valve actuation systems 30 may include a valve position sensor 74 configured to determine an open or closed position of the valve 22 and communicate with the control system 40. For reference, the power disconnect 46, remote override input 47, charging input connections 48, frame 102, and indicator light stack 62 are also shown.

With reference to FIG. 6A, each of these components may be controlled by control logic included as part of a control system 40 that includes a controller 44 (e.g., processor and memory contained within the control system 40, not shown) and a user interface 42. The user interface 42 may include a display panel 118 and a keyboard interface 122 that provides a means for direct user input to the control system 40. The user interface 42 may also include various ports for data import/export, and power input. For example, the user interface 42 may include a serial port output 116, an Ethernet data output 114, an input for user controller override (open) 112, and a backup power input 110.

While specific types of data connection and transfer are indicated in the description and figures, different connections and transfer means are within the scope of the present disclosure. For example, while specific types of wired data connections are shown, other means for wired and wireless data transfer are known and within the scope of the present disclosure. Moreover, while user input is shown to include a push button interface, a touch screen or other means for user input is also within the scope of the present disclosure (e.g., wireless transfer from another electronic or mobile device; see for example, FIGS. 6B and 6C). For example, the control system 40 may include a user interface 42 that is attachable to the system 10, such as on the case 103, and/or that may be configured for remote use, such as when carried by a user or positioned remote from the frame 102 housing the main hardware of the system 10 (i.e., valve assemblies 20, actuators 30, etc.). In this latter scenario, the user interface 42 may include hardware and software components that enable wireless communication.

As shown in FIGS. 6B and 6C, the control system 40 may include a controller 44 housed within a case, and a user interface 42 comprising a touch screen (e.g., combined display panel 118 and a keyboard interface 122).

The control system 40 may monitor, interpret, control, and provide user interface or information feedback regarding performance of the system and values returned from the various sensors. Moreover, the system 10 as a whole may be configured in various control methodologies. For example, a singularly controlled valve may be controlled through interpretation of a singular pressure sensing point. Alternatively, two separate valves may be controlled independently through interpretation of a singular pressure sensing point. Still further, two separate valves may be controlled independently through interpretation of two separate pressure sensing points. Still further, a singularly controlled valve may be controlled through interpretation of an input signal provided by a user. Still further, two separate valves may be controlled independently through interpretation of dedicated input signals provided by the user, such as through the user-controlled override (112), or via a wireless signal sent from an external processor and remote communications interface. Where the operational control signal is supplied by others, the inherent on-board logic may act in a back-up manner to provide redundancy.

As such, the system 10 of the present disclosure can include a control system 40 to receive signals from the at least one pressure sensor 50, from the valve position sensors 74, and from the user interface 42. According to certain aspects of the present disclosure, the pressure registered by control system 40 may be received as a signal from an external input, such as a wired or wireless signal from a pressure sensor on another system that is reading pressure in the main conduit 100, a bypass conduit (e.g., 5a), or a user input value.

According to certain aspects of the present disclosure, the control system 40 includes a controller 44 that may process these signals, such as at least a processor and memory. The controller 44 may be a portion of a detachable user interface unit 42, an integrated, attached portion of the system 10 (i.e., a portion of the system 10 residing in or on the electronics enclosure 4), or a remote server. Alternatively, the control system 40 may include a controller 44 in one or more of the user interface unit 42, as a portion of the system 10 integrated in the electronics enclosure 4, and a remote server. It is to be appreciated that aspects of the control system 40 can be implemented by various types of operating environments, computer networks, platforms, frameworks, computer architectures, and/or computing systems.

According to certain aspects of the present disclosure, the control system 40 may include calibration algorithms for sensors that may be included as part of the system or may allow user override of system registered values.

Implementations of the control system 40 are described within the context of a device configured to perform various steps, methods, and/or functionality in accordance with aspects of the described subject matter. It is to be appreciated that a control system such as a computing device or computer system can be implemented by one or more computing devices. Implementations of the control system 40 can be described in the context of a "device configured to", wherein the term configured may be taken to mean that the device can implement computer-executable instructions that are executed to perform various steps, methods, and/or functionality in accordance with aspects of the described subject matter.

In general, a computer system or computing device can include one or more processors and storage devices (e.g., memory and disk drives) as well as various input devices, output devices, communication interfaces, and/or other types of devices. A computer system or computing device can also include a combination of hardware and software. It should be appreciated that various types of computer-readable storage media can be part of a computer system or computing device. As used herein, the terms "computer-readable storage media" and "computer-readable storage medium" do not mean and unequivocally exclude a propagated signal, a modulated data signal, a carrier wave, or any other type of transitory computer-readable medium. In various implementations, the control system 40 may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

The control system 40 can implement and utilize one or more program modules. Generally, program modules include routines, programs, objects, components, data structures, etc., that perform particular tasks or implement particular abstract data types.

The control system 40 can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

The control system 40 can be implemented by one or more computing devices such as computers, PCs, server computers configured to provide various types of services and/or data stores in accordance with aspects of the described subject matter. Exemplary server computers can include, without limitation: web servers, front end servers, application servers, database servers, domain controllers, domain name servers, directory servers, and/or other suitable computers.

Components of the control system 40 can be implemented by software, hardware, firmware or a combination thereof. For example, the control system 40 can include components implemented by computer-executable instructions that are stored on one or more computer-readable storage media and that are executed to perform various steps, methods, and/or functionality in accordance with aspects of the described subject matter.

The control system 40 can include a controller 44, i.e., a processor and memory, and additional hardware storage, input devices, and output devices. Input devices can include one or more of the exemplary input devices described above and/or other type of input mechanism and/or device. Output devices can include one or more of the exemplary output devices described above and/or other type of output mechanism and/or device.

The control system 40 can contain one or more communication interfaces that allow the control system 40 to communicate with other computing devices and/or other computer systems. The control system 40 can include and/or run one or more computer programs implemented, for example, by software, firmware, hardware, logic, and/or circuitry of the control system 40. Computer programs can include an operating system implemented, for example, by one or more exemplary operating systems described above and/or other type of operating system suitable for running on computing device. Computer programs can include one or more applications.

Figure 7:
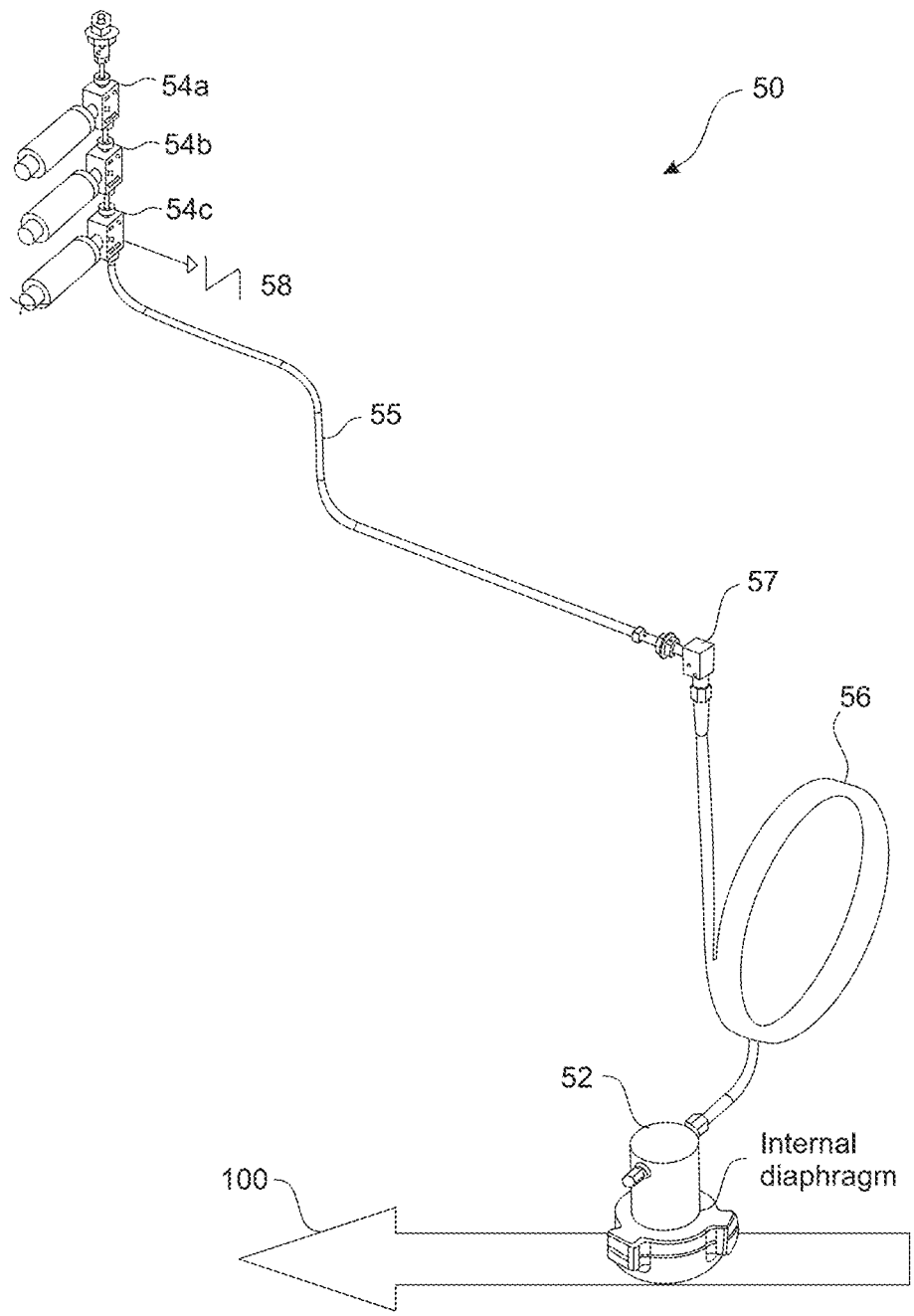
FIG. 7 illustrates a pressure sensor system in accordance with certain aspects of the present disclosure.

As shown in FIG. 1, the system 10 may include one or more pressure sensors 52 that may be positioned on a main conduit 100 or on a bypass line (e.g., 5*a*). With reference to FIG. 7, an exemplary pressure sensor system 50 according to certain aspects of the disclosure is shown. The pressure sensor system 50 may include at least one pressure transducer (54*a-c*) and a pressure sensor 52. The pressure sensor 52 may include a diaphragm configured to sense an external pressure and deform to translate that external pressure to an internal pressure on a pressure fluid within a pressure chamber (i.e., pressure against the diaphragm pressurizes the pressure fluid within the pressure chamber). This pressurization of the pressure fluid is then registered by the at least one pressure transducer (54*a-c*) and converted to an electrical signal (e.g., piezo-resistive pressure sensor or silicon cell). The electrical signal 58 may then be communicated via a communication cable to the control system 40 where the signal may be calculated and utilized to control a pump operation of the valve actuation system 30.

According to certain aspects of the present disclosure, at least two pressure transducers are included as part of the pressure sensor system 50, and the signal from the pressure sensor system 50 received by the controller may comprise individual signals from the two pressure transducers. This allows the system to provide an almost instantaneous response to a pressure registered by the pressure sensor 52, such as an overpressure event. The individual signals may be received at a rate of at least 50 signals/second, such as 75 signals/second, or even 100 signals/second.

According to certain aspects of the present disclosure, three pressure transducers (54*a-c*) may be included as part of the pressure sensor system 50, and the signal from the pressure sensor system 50 received by the controller may comprise individual signals from the three pressure transducers. Such redundancy provides a near fail-safe system; should one transducer work improperly or fail, the readings from the failed transducer would differ from those of the other two transducers. The system would be configured to discard the "odd" third pressure reading from the failed transducer and register the correct readings from the other two transducers.

The presently disclosed system 10 may include other redundant aspects to protect overall operation, such as filters for the actuator fluid positioned in fluid lines both before and after a pressurization chamber, i.e., accumulator, and in fluid lines leading to a pressurized fluid storage tank. Additionally, each valve assembly may include an actuator, wherein the actuator fluid may be independently pressurized in an accumulator (i.e., one accumulator for each valve assembly).

With continued reference to FIG. 7, the at least one pressure transducer (54*a-c*) may be any pressure sensor device capable of receiving and measuring physical pressure from the pressure fluid within a pressure chamber (i.e., chamber comprising the pressure fluid, wherein at least one wall or a portion thereof comprises the diaphragm that deforms with changes in an external pressure). A pressure passage 56/55 may be fluidly connected between the interior of the diaphragm and the at least one pressure transducer (54*a-c*) to transfer a pressure from the pressure fluid within the pressure chamber to the pressure transducer. The diaphragm may be comprised of a flexible and deformable structure so that an external pressure in the diaphragm causes a deformation that may be registered by the pressure fluid. Selection of the materials used for construction of the diaphragm may take into account the expected pressures to which the diaphragm may be exposed. For example, in the hydraulic fracturing industry, the pressures within conduits may be as high as 10,000 to 30,000 psi. As such, the diaphragm may be formed of a metal material capable of withstanding these high pressures yet flexible enough to deform with changes in the pressure.

The pressure sensor 52 may be positioned on a conduit so that the diaphragm comes into direct contact with the fluid in the conduit, and can respond to, or measure, a fluid pressure of the liquid within the conduit (5 or 100; external pressure). This external pressure on the diaphragm is translated via the pressure passages 55/56 to the at least one pressure transducer. One portion of the pressure passage 55 and the at least one pressure transducer (54*a-c*) may be housed in the hydraulics enclosure 3. A second portion of the pressure passage 56 may be connectable via a port 36 on the hydraulics enclosure 3, such as by a connector end 57 on the pressure passage 56.

The diaphragm is sealed with respect to the at least one pressure transducer so that fluids in the conduit to which the sensor 52 is attached do not come into contact with the at least one pressure transducer (54*a-c*). This latter function is enabled by the design of the pressure sensor 52. That is, the diaphragm contacts and retains a pressure fluid within the diaphragm (e.g., in a pressure chamber). The pressure fluid is preferably comprised of a relatively non-compressible and non-expandable fluid such as, but not limited to, oil to efficiently transfer the external fluid pressure applied to the diaphragm to the at least one pressure transducer (54*a-c*). The pressure fluid preferably has no or a limited amount of air or other gases that can be compressed or expand based on temperature.

The pressure sensor 52 may include a pressure chamber which encloses the diaphragm and the pressure fluid. According to certain aspects of the present disclosure, the pressure chamber is preferably a hollow cylindrical structure, wherein the diaphragm is compressible based on the external fluid pressure. The diaphragm may have a substantially circular, square, or rectangular cross sectional area, and/or may be formed as a disk, a bellows, a cylindrical structure, or any other structure that may deform in a manner indicative of a fluid pressure in a conduit to which the diaphragm is attached.

Figure 8A:
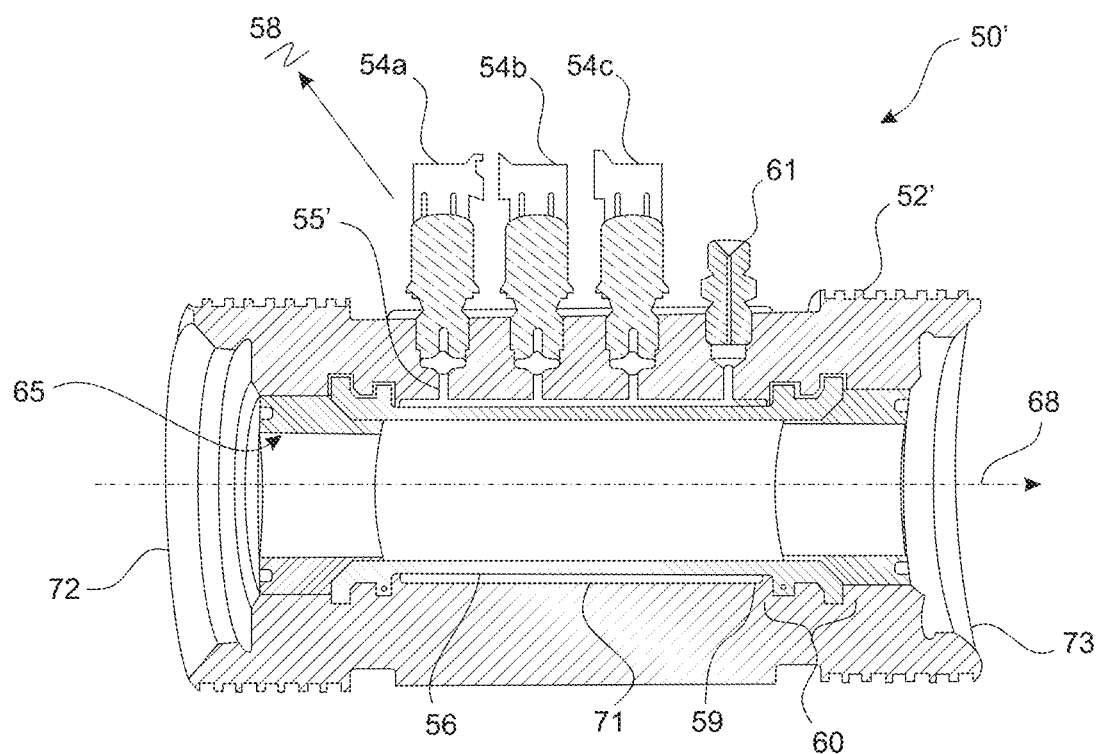
Figure 8B:
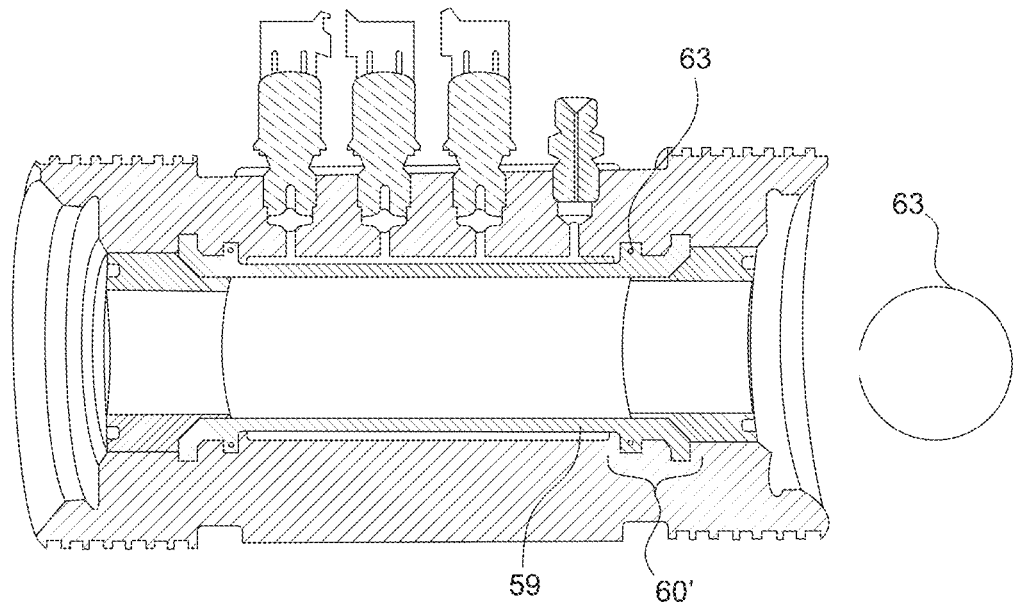

For example, a pressure sensor system 50' comprising a cylindrical diaphragm 59 is shown in FIGS. 8A and 8B. The pressure sensor system 50' may comprise a sensor body 52' having an inlet end 72 and an outlet end 73 connectable inline on a conduit, and a longitudinal bore 68 therethrough defined by an internal cylindrical wall 65. While shown in a specific orientation, the pressure sensor system 50' could be positioned in an opposite orientation, i.e., having the inlet and outlet ends swapped, and function as described herein.

At least a portion of the internal cylindrical wall 65 of the sensor body 52' may comprise a cylindrical diaphragm 59. The diaphragm may be formed of a deformable material, so that when the sensor body 52' is positioned in-line on a conduit, such as a main conduit 100 or a bypass conduit 5, a pressure of the fluid flowing through the longitudinal bore 68 of the pressure sensor 52' may push against an exterior wall of the diaphragm 59 causing it to deform inward. As shown in FIG. 8A, the pressure sensor further includes a pressure chamber 56 surrounding the diaphragm 59, i.e., the diaphragm 59 forms one cylindrical wall of the pressure chamber 56, the other wall being formed by an opposing surface 71 of the internal bore. The pressure chamber may further include pressure passages 55' that provide communication of the pressure fluid in the pressure chamber 56 and the at least one pressure transducer (54*a-c*), thereby transferring a pressure of the pressure fluid within the pressure chamber to the pressure transducer.

The diaphragm may be any deformable material capable of responding to pressure within a user selected range. For example, as detailed above, the diaphragm may be a metal or polymer capable of registering pressure, i.e., reversible deformation, in the range of 10,0000 psi to 30,000 psi. According to certain aspects, the diaphragm 59 may be formed of an elastomeric polymer, such as polyurethane. Moreover, the fluid in the pressure chamber, i.e., pressure fluid, may be a relatively non-compressible fluid such as a hydraulic fluid.

As shown in FIG. 8A, the pressure sensor system 50' may further include a charging port 61 for the pressure fluid in the pressure chamber 56. The pressure chamber is thus a closed system, such that deformation of the diaphragm inward will increase a pressure of pressure fluid within the pressure chamber 56, which is communicated via the pressure passages 55' to at least one pressure transducer (54*a-c*). As discussed above, the pressure sensor system 50' may comprise more than one pressure transducer, preferably three pressure transducers, to provide a nearly fail-safe system. The electrical signal(s) 58 from each pressure transducer may be communicated via a wired or wireless signal to the control system 40 where the signal may be received, converted to a registered pressure reading, and utilized to control a pump operation of the valve actuation system 30.

Also shown in FIGS. 8A and 8B are various connection means between cylindrical ends of the diaphragm 59 and the internal bore 65 of the sensor body 52'. For example, shown in FIG. 8A are threaded ends 60 of the diaphragm 59 that may secure and seal the diaphragm within corresponding threads or grooves of the internal bore 68 of the sensor body 52'. According to certain aspects, the threaded ends 60 may be bonded to the corresponding threads or grooves of the internal bore 68. Alternatively, or additionally, an attachment ring 63 may be inserted, bonded, or molded into a thread of the threaded end 60 of the diaphragm 59, as shown in FIG. 8B.

While specific embodiments of the pressure sensing system (50, 50') have been described herein, others are possible and within the scope of the present disclosure.

With reference back to FIGS. 2-5, the valve assembly may include any type of actuator (32*a*-32*c*) configured to operate the valve (22*a*-22*c*) from the closed position to an open position, and then back to the closed position during each of a plurality of operation cycles. In some cases, each valve actuator (32*a*-32*c*) may be a solenoid actuator, a hydraulic actuator, a magnetic actuator, an electric motor, pneumatic actuator, and/or other similar or different types of actuators, as desired. According to certain embodiments, each valve actuator (32*a*-32*c*) may be a pneumatic or hydraulic actuator driven by an actuator fluid 34. In preferred embodiments, each valve actuator (32*a*-32*c*) may be a hydraulic actuator driven by hydraulic fluid in a hydraulic fluid reservoir 34. Such an embodiment may provide improved safety on extreme worksites, such as those of a standard hydraulic fracturing or wellbore completion operation (e.g., exposure to extremes temperatures and weather).

With reference to FIGS. 9-20, various implementations of a valve assembly in accordance with aspects of the present disclosure are shown. With specific reference to FIG. 9, the valve assembly generally comprises a valve assembly 20 having a longitudinal bore therethrough allowing a flow of fluids, such as in the direction shown by the arrow 2. The valve assembly 20 generally includes an upstream connection 86 having an upstream connector 23 and a downstream connection 87 having a downstream connector 24 (also shown as 6 and 7, respectively, in FIG. 2) that provide connection to sections of bypass conduit. While the downstream connector 24 is shown as an exterior threaded section on the downstream connection 87 and the upstream connector 23 is shown as in rotatable ring (e.g., having threads on an inside surface of the ring), these connectors may be switched or replaced by different means for connection to conduit lines.

Figure 9:
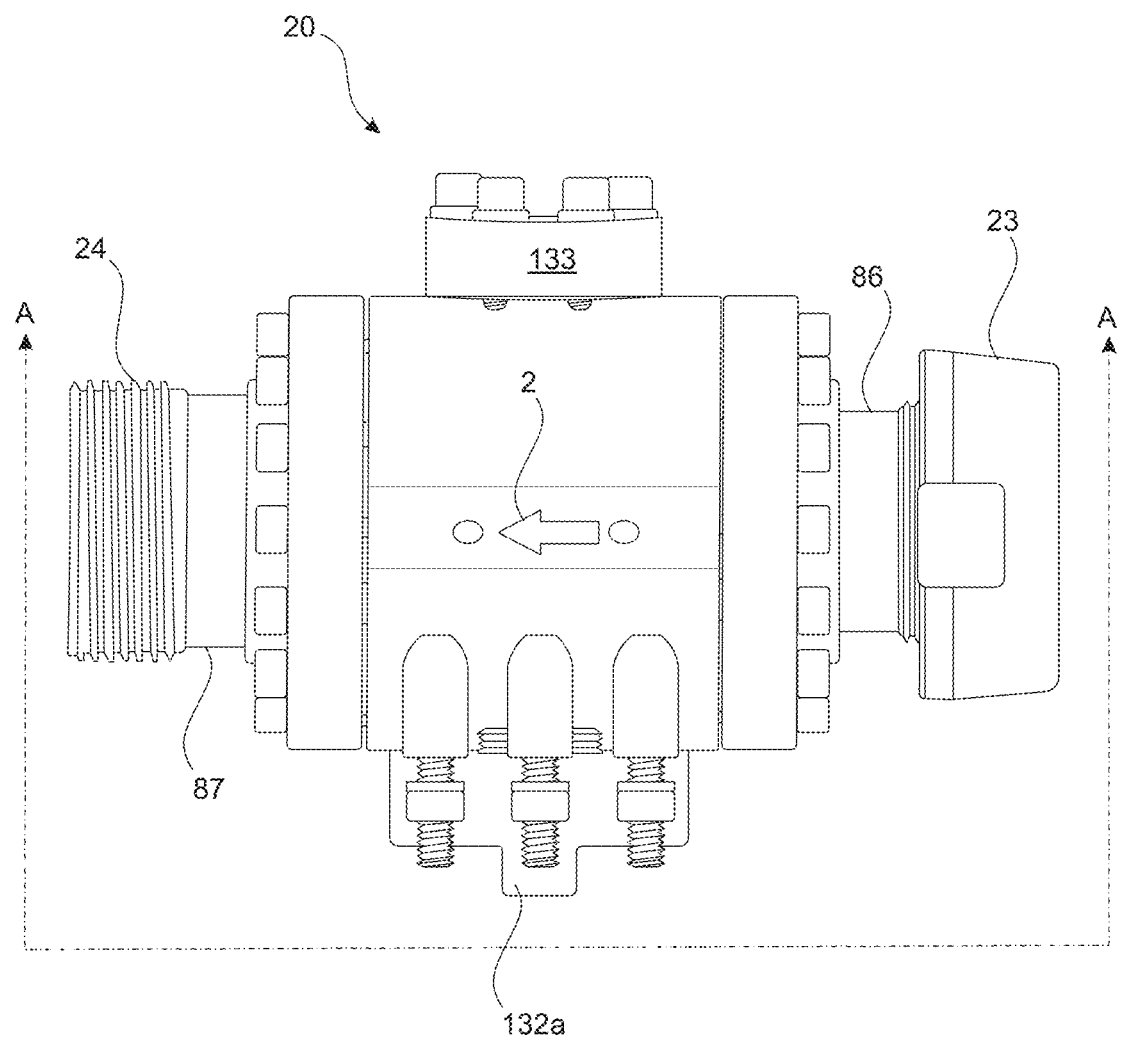
FIG. 9 illustrates a valve housing of a valve in accordance with certain aspects of the present disclosure.
Figure 12:
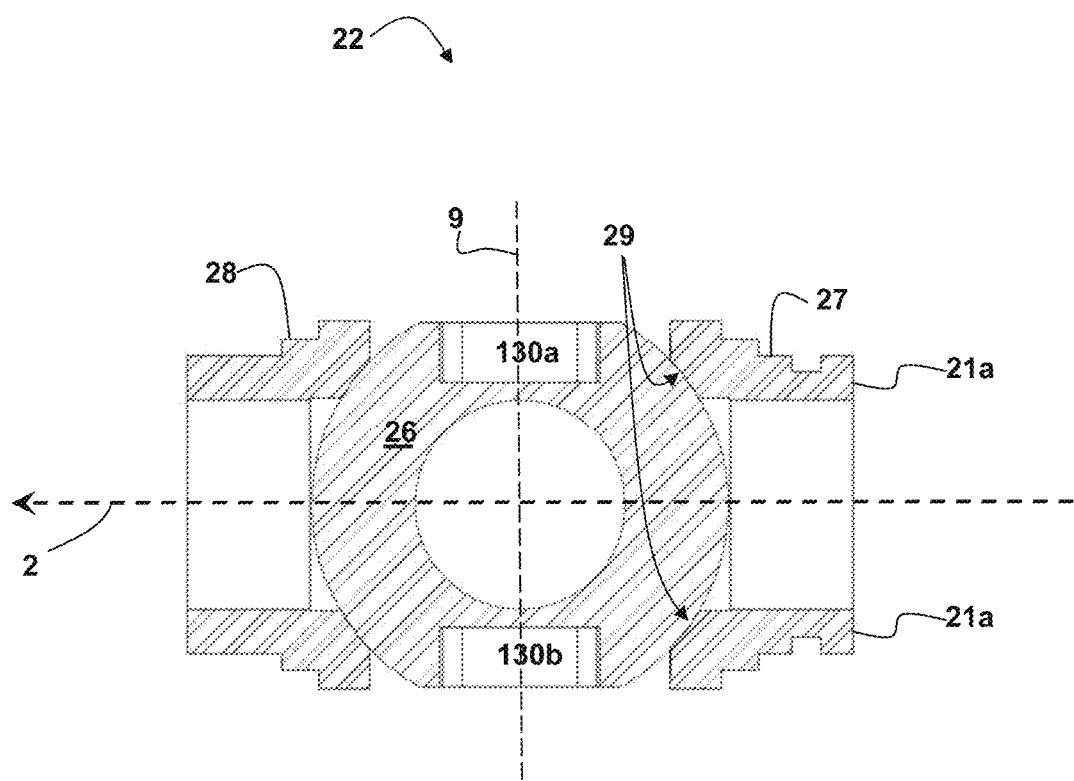
FIG. 12 illustrates a close-up view of the ball and seat assembly of the valve shown in cross-section in FIG. 10.

Also shown in FIG. 9 are an actuating stem 132*a* that provides connection to the valve via a connection port 130*a* (i.e., on ball valve 26 of FIG. 12) so that it may be opened or closed by the actuator (any of 32*a*-32*c*). The ball valve shown in FIG. 12 is a trunnion mounted ball valve having a trunnion 132*b* and a trunnion cap 133 (see also FIG. 10), wherein the trunnion is attachable in a bottom connection port 130*b* on the ball valve 26 (see FIG. 12). While the valve shown in the figures are trunnion mounted, which work practically well in conditions experiencing high velocity flow, other types of ball valves are within the scope of the present disclosure.

Figure 10:
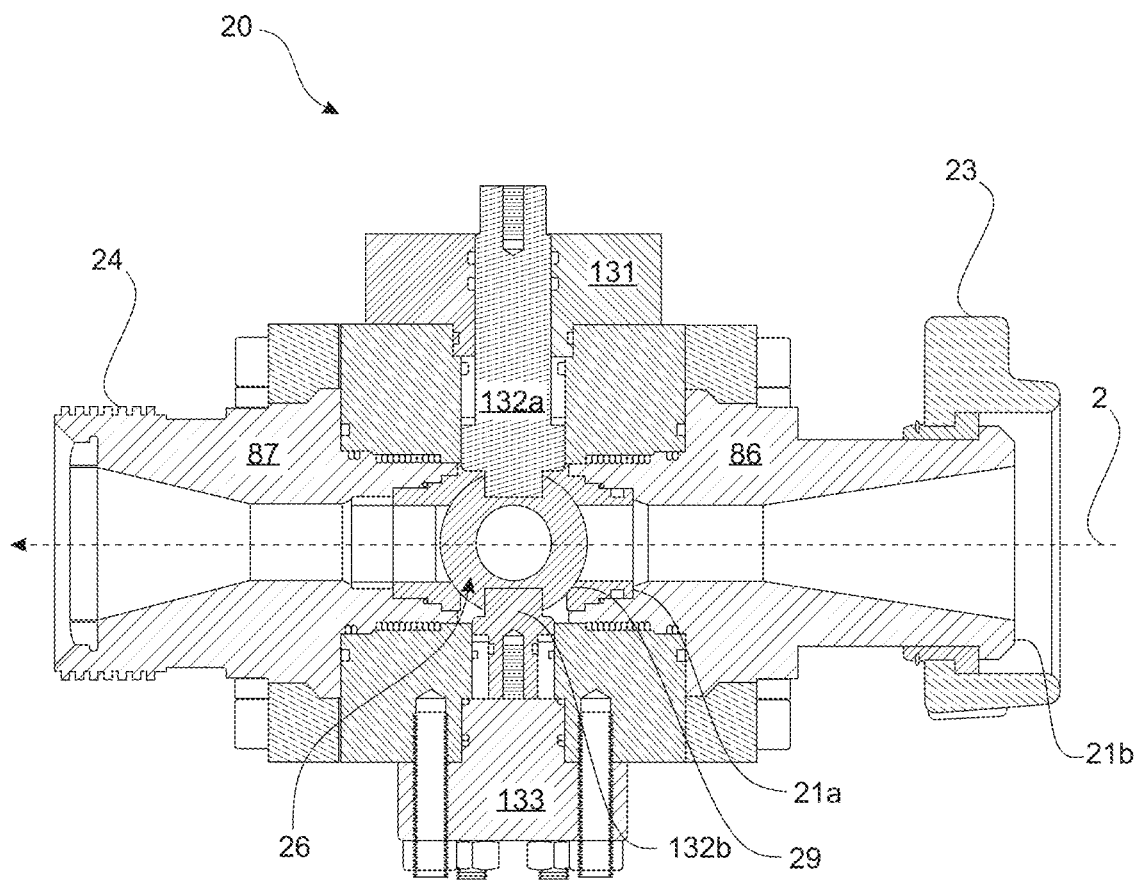
FIG. 10 illustrates a cross-sectional view taken along line A-A of the valve housing of FIG. 9 showing a valve configured for rapid pressure loss in accordance with certain aspects of the present disclosure.

FIG. 10 shows a cross-sectional view of the valve assembly 20 taken along line A-A of FIG. 9. Contained within the valve assembly 20 is a valve 22 having a valve body. As shown, the valve may be a ball valve wherein the valve body comprises a ball 26 with a throughbore, wherein an open position of the ball 26 within the valve 22 provides flow-through alignment (see arrow 2) of the throughbore with upstream and downstream connections (23 and 24, respectively) of the valve assembly 20, and a closed position of the ball 26 provides an out of flow-through alignment of the throughbore with the upstream and downstream connections of the valve assembly.

With reference to FIGS. 10 and 12, the ball 26 of the valve 22 may be selectively rotatable within the valve 22 about an axis (line 9) to the open and closed positions. The valve 22 may further have a seat assembly comprising an upstream seat 27 and a downstream seat 28 positioned against the ball 26, each having a longitudinal bore therethrough (arrow 2; note, the ball 26 is shown in the closed position in FIGS. 10 through 14 with the throughbore out of alignment with the longitudinal bore of the valve assembly and the upstream and downstream seats). Also shown are the actuating stem 132*a* and connection port 130*a* for the stem on the ball 26 (132*b* is a trunnion attachable in a bottom connection port 130*b* on the ball 26).

The upstream seat 27 of the ball 26 may include an outward facing surface 21*a* positioned perpendicular to the longitudinal bore of the valve housing, such that a fluid pressure on the outward facing surface 21*a* may force the upstream seat against a sealing face 29 of the ball 26. Additionally, the upstream connection 86 of the valve housing may include a sloped section that reduces the diameter of the longitudinal bore such that fluid pressure is exerted on the upstream connection 86 and thus on the outward facing surface 21*a* of the upstream seat 27. Finally, the upstream connection 86 may also include an outward facing surface 21*b* that may be exposed to a fluid flow, such that fluid pressure on the outward facing surface 21*b* may force the upstream connection 86 against the upstream seat 27, in turn forcing the upstream seat 27 against the sealing face 29 of the ball 26. This acts to provide a dynamic seal for the ball 26 within the valve 22, wherein increased fluid pressure within the conduit leads to dynamic increases in the sealing pressure applied on the sealing face 29. Moreover, the unique arrangement of seats on the ball, and positioning of the ball within the valve housing, isolates the sealing face from the abrasive fluid flow in the conduits. When closed, no portion of the seal in the ball valve is exposed to the fluid flow, and when open, the sealing face on the ball is turned away from the fluid flow (out of alignment).

Figure 14:
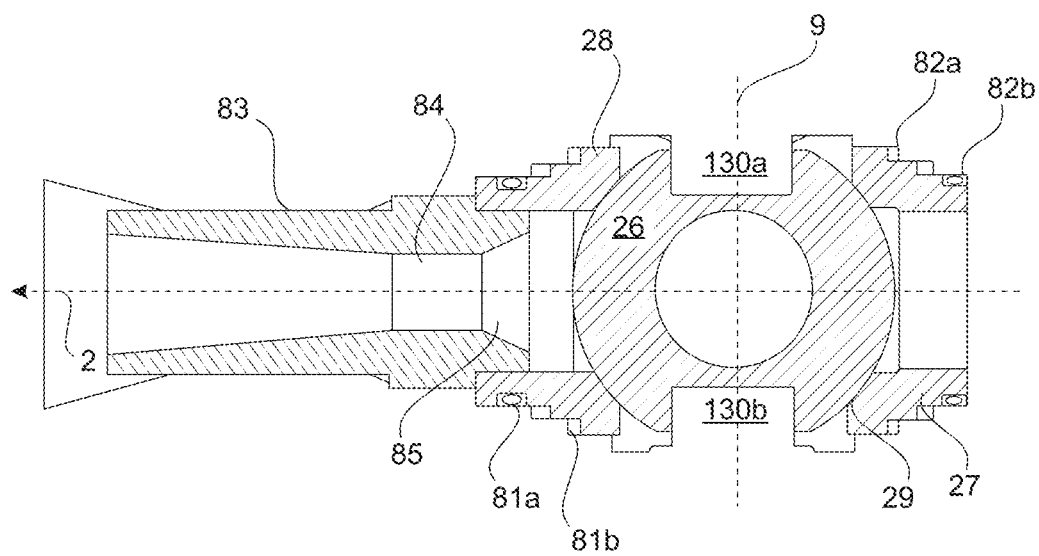
FIG. 14 illustrates a close-up view of the ball, seat assembly, and downstream flow restriction of the valve shown in cross-section in FIG. 13.

With reference to FIG. 14, the upstream seat 27 and downstream seat 28 may include gaskets 82*a*, 82*b* and 81*a*, 81*b*, respectively, that may further assist in providing a liquid tight connection between these upstream and downstream seats and the upstream and downstream connections (86, 87), respectively.

The ball 26 may be connected to the valve actuator 32 via an actuating stem 132*a*. According to certain aspects of the present disclosure, the valve actuator 32 may be any valve actuation system, such as an actuation system that uses linear, rotational, or a combination of rotary and linear movement, e.g., scotch yoke, crank/slider, and rack and pinion. In preferred embodiments, the actuator uses a combination of rotary and linear movement so that as the actuator moves linearly within a housing, the actuating stem 132*a* connected between the ball 26 and the actuator 32 rotates and causes the ball 26 to rotate within the valve housing.

As example, when the actuator is configured as a scotch yoke, the actuating stem 132*a* may include a disk having a pin that interacts with a sliding yoke at one end of a piston of the actuator 32. Movement of the piston within an actuator chamber may provide linear movement of the yoke that is translated to a rotational movement of the stem 132*a*. Also shown in FIG. 10 are the trunnion cap 133 and bonnet 131 of the valve assembly.

According to certain aspects, the valve assembly may be configured to provide a rapid reduction in the pressure within a main conduit 100 or may provide a controlled reduction of the pressure in the main fluid conduit. When the valve assembly is configured to provide a rapid reduction in the pressure, i.e., rapid pressure loss, the valve actuation system may be configured to open the valve at a rate sufficient to reduce the fluid pressure in the main conduit by at least 50% within 1 second, or 70% within 1 second, or even 90% within 1 second. When the valve assembly is configured to provide a controlled reduction of the pressure, the valve actuation system may be configured to open the valve at a rate sufficient to reduce the fluid pressure in the main conduit by the controlled amount within 2 seconds, or within 1 second, or even within 0.5 seconds. Thus, opening such a valve assembly comprising restrictive regions or components may reduce the fluid pressure in the fluid line by at least 1% within 1 second, or 3% within 1 second, or even 5% within 1 second. Moreover, the controller may be configured to hold the valve open for a period when the user requires complete fluid pressure de-energization in the fluid line and, if/when the user desires, the controller may be configured to close the valve.

Moreover, the controller may be configured to hold the valve open for a set time period when the fluid pressure in the main conduit exceeds the user-defined high pressure limit, and if, after the set time period, the fluid pressure in the main conduit is at or below the user-defined low pressure limit, the controller is configured to close the valve.

Figure 11:
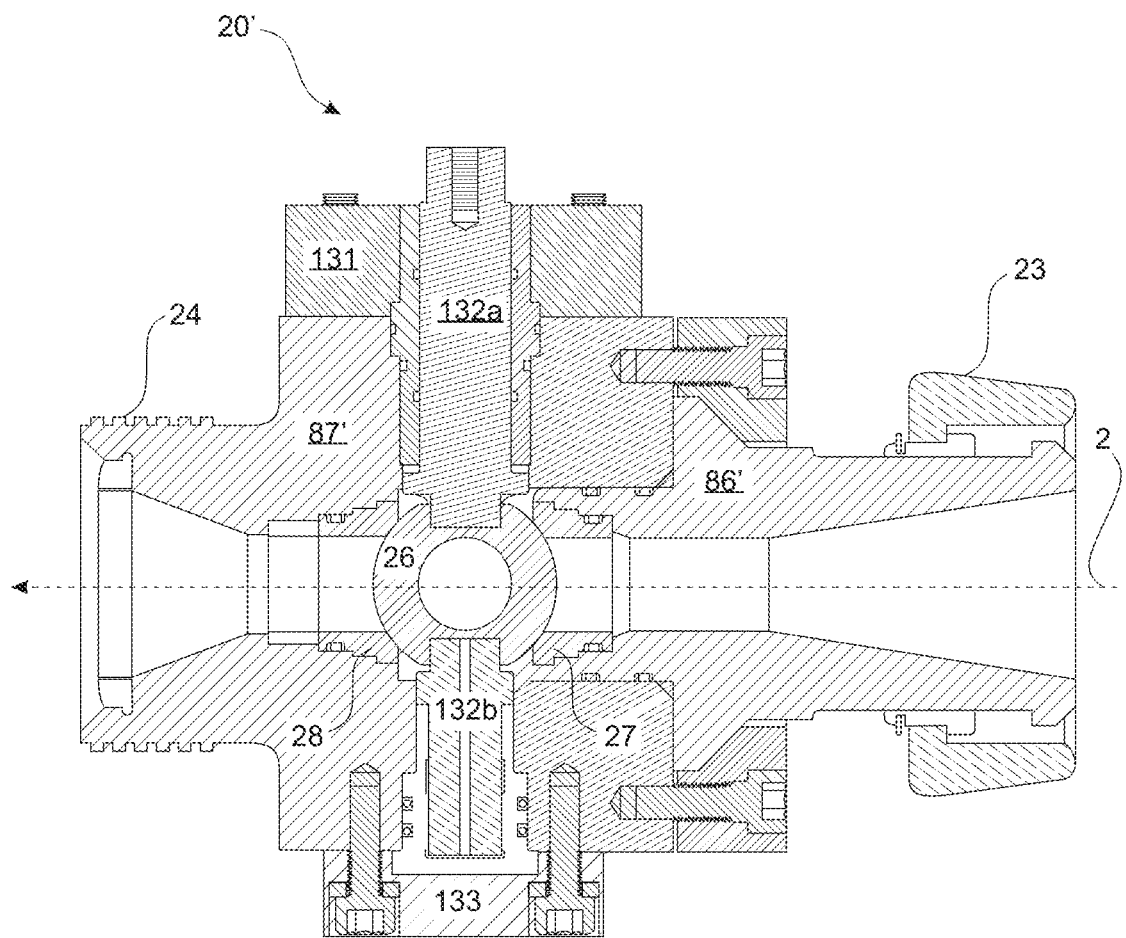
FIG. 11 illustrates a cross-sectional view taken along line A-A of FIG. 9 of an alternative valve configured for rapid pressure loss in accordance with certain aspects of the present disclosure.

Another design for the valve assembly 20' of the present disclosure is shown in FIG. 11, wherein a downstream connection 87' of the valve assembly 20' is configured as a one-component attachment to reduce the overall weight of the valve assembly 20'. As shown, the upstream connection 86, upstream connector 23, and upstream seat 27 may be substantially as described with reference to FIG. 10. The downstream region of the valve assembly 20' may be configured as a single fixture directly attachable to a downstream side of the valve body, enclosing both the downstream seat 28 and the valve body (e.g., ball 26).

Figure 13:
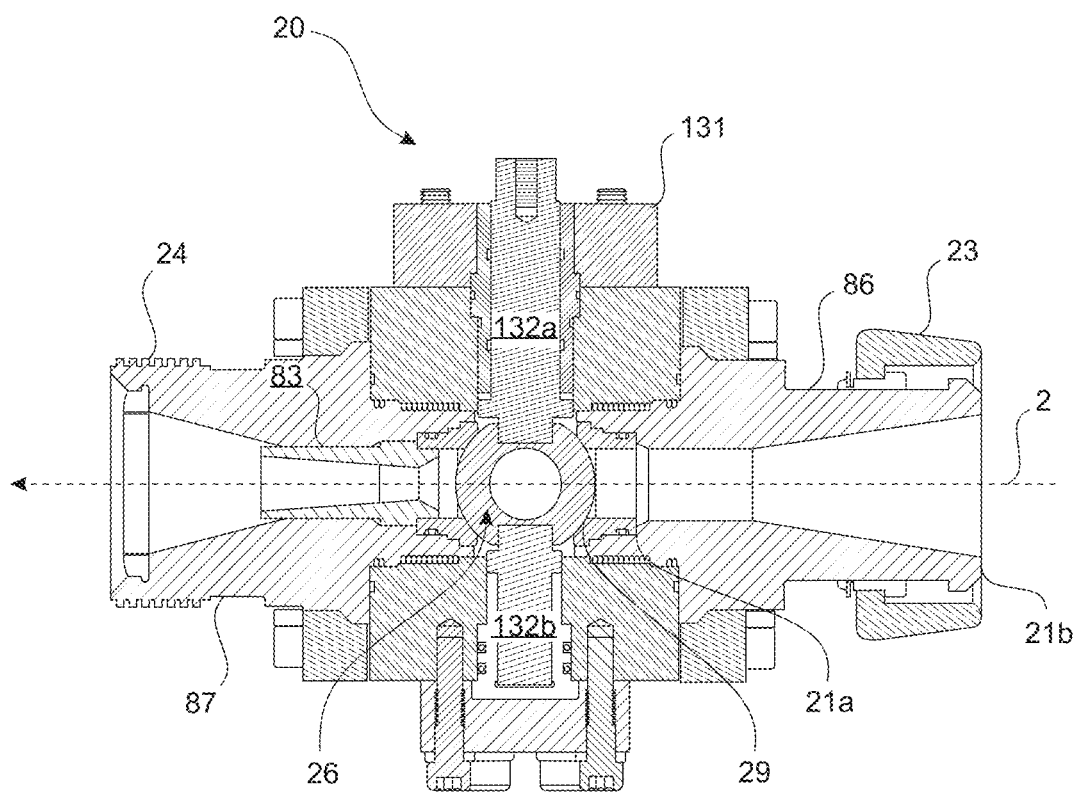
FIG. 13 illustrates a cross-sectional view taken along line A-A of the valve housing of FIG. 9 showing a valve configured for controlled pressure decline in accordance with certain aspects of the present disclosure.

As shown in FIGS. 13 and 14, a downstream connection 87 of the valve assembly may include a portion having a reduced diameter 84 as compared to the diameter of the upstream connection 86, upstream seat 27, and/or throughbore of the ball 26, and may also include a portion having a graduated or sloped approach 86 to the reduced diameter section 84, These portions of the downstream connection 87 act to restrict the flow of fluid through the valve assembly 20 and thus provide a metered or controlled reduction of the pressure in the main conduit. Variation in the amount of diameter reduction in the downstream connection 87 provides an inverse variation in the amount of pressure reduction provided by opening the valve in the valve assembly (i.e., greater reduction in diameter of the downstream connection 87 leads to lesser pressure reduction on valve opening).

As shown in FIGS. 13-15, the reduced diameter section of the downstream connection 87 may be implemented using an insert 83 that includes the reduced diameter section 84. Alternatively, the downstream connection 87 may, have a throughbore comprising the reduced diameter section 84.

According to certain aspects, the reduced diameter region may also be positioned in the upstream connection 86 as either a reduced diameter section or an insert (not shown).

According to yet further aspects, the reduced diameter region may also be positioned upstream or downstream from the valve assembly, such as in the bypass conduit (see Sa or 5b, respectively, in FIG. 1) distal from the upstream connection 86 or downstream connection 87, Moreover, the reduced diameter region may be positioned at any distal position, such as less than a millimeter downstream from the upstream connection 86 or downstream connection 87 to more than 500 meters from the upstream connection 86 or downstream connection 87 or more. When the fluid in the fluid lines contains particulate matter, it is preferable to position the reduced diameter region or insert downstream from the valve.

According to certain other aspects, controlled and/or variable reduction of the pressure in the main conduit 100 may be achieved through use of one or more flow restrictors. These flow restrictors may be positioned within the valve assembly, such as within the downstream connection 87. These flow restrictors may also be positioned downstream from the valve assembly, such as in the bypass conduit (see 5b in FIG. 1) distal from the downstream connection 87. As with the reduced diameter regions, the flow restrictors may be positioned at any distal position, such as less than a millimeter downstream from the downstream connection 87 to more than 500 meters from the downstream connection 87 or more. Moreover, according to certain aspects, the flow restrictors may be positioned at any upstream position, such as within the upstream connection 86, or less than a millimeter upstream from the upstream connection 86 to more than 500 meters from the upstream connection 86 or more.

Any device configured to achieve restricted flow is within the scope of the present disclosure. For example, a flow restrictor may include a solid insert having one or more perforations or slots that act to reduce fluid flow through the insert. The insert may be a separate portion of the system, such as a separate portion of the downstream connection 87 as shown in FIGS. 13 and 14 or may be an integral portion or region of the downstream connection 87. An exemplary configuration for a flow restrictor 83a according to the present disclosure is shown in FIG. 15A, wherein the flow restrictor 83a may be an insert positionable within the downstream connection 87 (see FIG. 13 for reference).

Figure 15A:
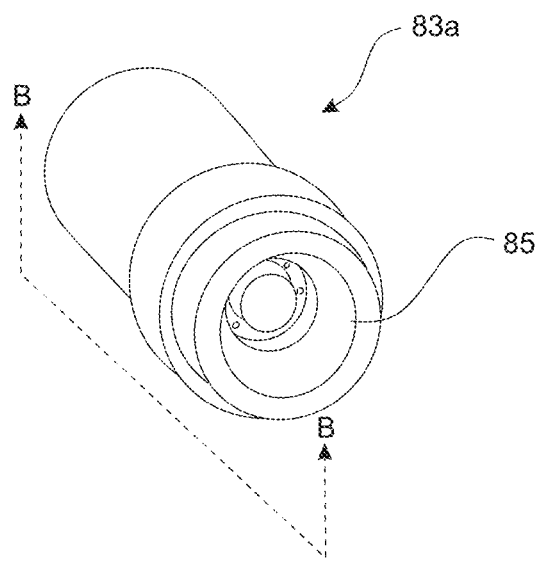
FIG. 15A illustrates a flow restrictor design for a valve configured for controlled pressure decline in accordance with certain aspects of the present disclosure.
Figure 15B:
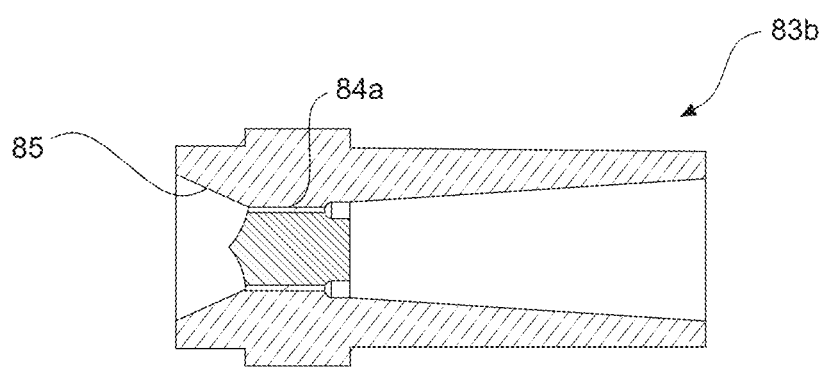
FIG. 15B illustrates a cross-sectional view taken along line B-B of FIG. 15A of another design for a flow restrictor design in accordance with certain aspects of the present disclosure.
Figure 15C:
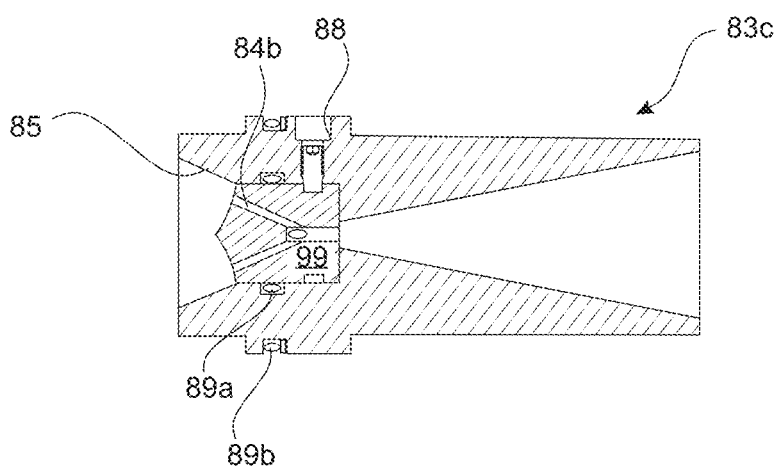
FIG. 15C illustrates a cross-sectional view taken along line B-B of FIG. 15A of a design for a two-piece flow restrictor in accordance with certain aspects of the present disclosure.

FIG. 15B shows a cross-sectional view of another variation of a similar flow restrictor 83b taken along the line B-B of FIG. 15A. The sloped approach 85 to a set of one or more perforations 84a is shown. Another flow restrictor 83c design is shown in FIG. 15C, which includes a sloped approach 85 to a set of one or more perforations 84b, which may be included as part of an insert 99 at an end of the flow restrictor. As shown, the insert 99 may be held in place within the flow restrictor 83c with a set screw 88 and sealed against an inner surface of the flow restrictor 83c with an O-ring 89a. Additional O-rings 89b may be included to seal the flow restrictor 83c within the downstream connection 87. While O-rings are indicated to be used for the purpose of providing a seal between surfaces, specifically a liquid-tight seal, other means of providing a seal are known and within the scope of the present disclosure According to aspects, the perforations of the flow restrictor limit the flow of fluids through the valve assembly and thus control the amount of pressure reduction in the main conduit provided by the valve assembly. The number, diameter, and length of the perforations may be adjusted to change the amount of fluid flow through the valve assembly.

Figure 16:
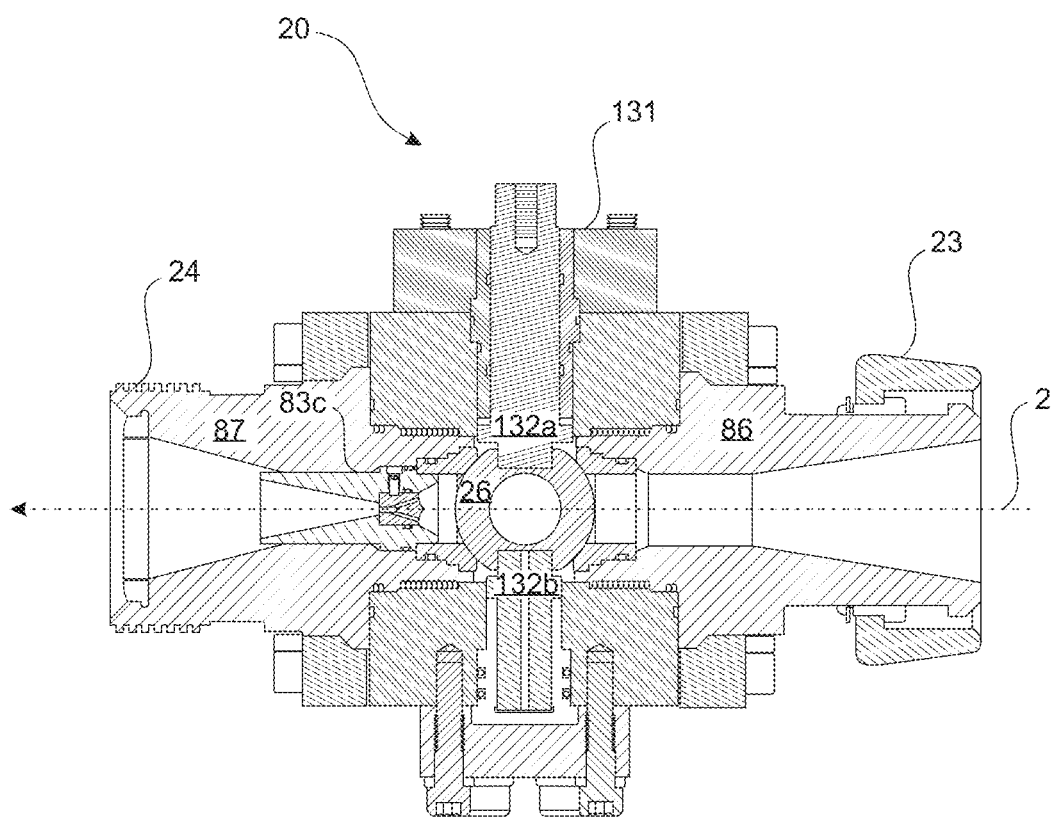
FIG. 16 illustrates a cross-sectional view taken along line A-A of FIG. 9 of a valve configured for controlled pressure decline, wherein the downstream portion includes the removeable two-piece flow restrictor of FIG. 15C.

FIG. 16 illustrates an exemplary valve assembly 20 including the flow restrictor 83c of FIG. 15C. As shown, the flow restrictor 83c may be positionable within the downstream connection 87 of the valve assembly 20. One advantage of configuring the flow restrictor (e.g., 83a, 83b, or 83c) as a separate component of the downstream connection 87 is that it may be easily removed and replaced in the case of excessive wear or clogging with particulate matter.

The number, diameter, and length of the perforations, or of a reduced diameter section (i.e., diameter and length of the reduced diameter section) will dictate the amount of pressure reduction provided by the section or insert of the present disclosure. As such, the amount of fluid flow through a valve assembly may be varied by exchanging the reduced diameter section or insert, and thus the amount of pressure reduction provided. Moreover, configuring this portion of the valve assembly as an insert such as shown in FIGS. 13-16 allows the fluid flow through the inventive valve assembly to be quickly changed by exchanging the insert. As such, the same overall architecture for the valve assembly may be used to provide a wide range of fluid flow rates therethrough.

Figure 17A:
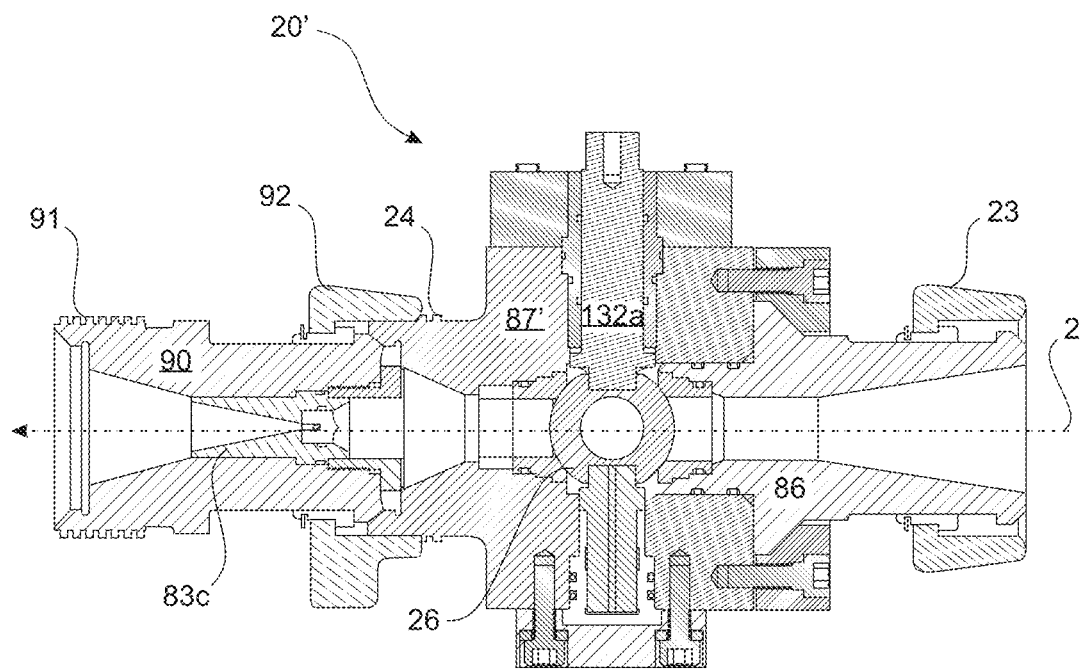
FIG. 17A illustrates the valve of FIG. 11 including a downstream attachment containing a flow restrictor in accordance with certain aspects of the present disclosure.
Figure 17B:
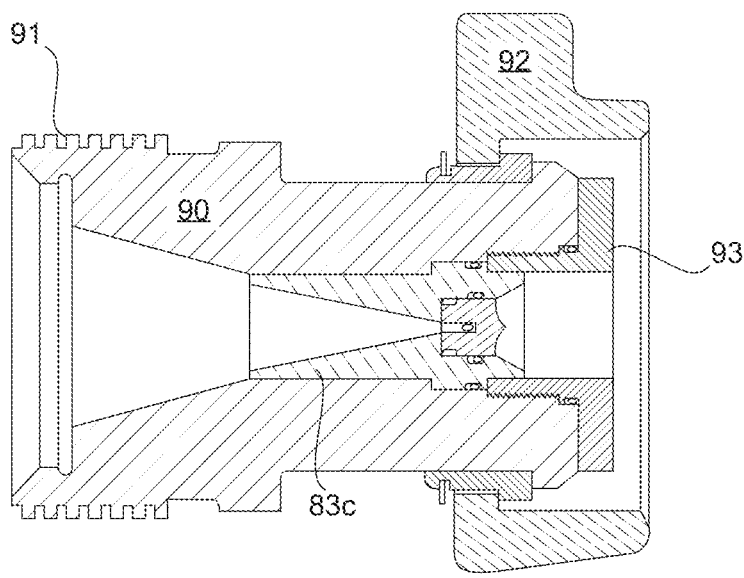
FIG. 17B illustrates a close-up view of the flow restrictor attachment of FIG. 17A.

Another exemplary valve assembly is shown in FIGS. 17A and 17B, which provides rapid changeout of the flow restrictor. As illustrated, the valve assembly 20' may be configured as shown in FIG. 11 wherein the downstream connection 87' is directly connectable to a downstream seat 28 of the valve body (ball 28). A flow restrictor attachment 90 may be connected to the downstream connection 87' via a joining means, e.g., via an attachment ring 92 having an internal thread configured to mate with the external thread of the downstream connector 24. The flow restrictor attachment 90 may further include a downstream joining means 91 configured for connection to a conduit. The flow restrictor attachment 90 may be designed to include an integral flow restrictor according to any of the designs disclosed herein (83a, 83b, 83c) or may be deigned with a removeable flow restrictor insert (e.g., insert 99 shown in flow restrictor 83c), such as shown in FIGS. 14-16.

Alternatively, the flow restrictor attachment. 90 may be connected to the upstream connection 86 via a joining means, e.g., via the attachment ring (upstream connector 23) having an internal thread configured to mate with the external thread of the downstream joining means 91.

FIG. 17B shows a close-up view of the flow restrictor attachment 90, wherein the flow restrictor 83c is included and held in place within attachment 90 by a threaded connector 93. While the threaded connector 93 is shown to have an exterior circumferential thread that mates with an internal circumferential thread on the flow restrictor attachment 90, other connection means are possible and within the scope of the present disclosure. Moreover, other means of securing the flow restrictor (any of 83a, 83b, 83c, etc.) within the flow restrictor attachment 90 are possible and within the scope of the present disclosure. Configuring the flow restrictor 83a, b, or c) to be part of an attachment, such as the flow restrictor attachment 90, allows rapid changeout of the part when worn or damaged. Such a configuration also provides a means to achieve a wide range of fluid flow rates through the valve assembly (20, 20') through use of different flow restrictors and/or inserts (e.g., the insert 99 held in place with the set screw 88 of flow restrictor 83c) designed to provide different flow volumes, i.e., simple exchange of the flow restrictor and/or insert in the flow restrictor attachment 90 to the valve assembly.

According to certain aspects, the flow restrictor attachment may be configured to provide a range of fluid flow adjustments without exchanging parts (i.e., flow restrictors 83a, 83b, 83c and/or inserts 99 as described hereinabove). For example, a flow restrictor attachment may be configured to include at least two flow adjustment ports that may be individually opened or closed to vary the amount of fluid allowed to flow therethrough. The flow restrictor attachment may include three, four, or more ports evenly spaced about one or more outlet flow paths. As shown FIG. 18A, the flow restrictor attachment 90a may include eight (8) flow adjustment ports configured as two sets of four (4) radially spaced ports about a circumference (two ports are labeled, 94a and 94b). Each set may be offset with respect to the other for ease of access.

The flow restrictor attachment 90a may include an inlet end 97 and an outlet end 96, connectable as described herein to a downstream or upstream connection of the valve assembly (20, 20') so that a fluid flow path shown by arrow 106 is provided. With reference to FIG. 18B, a cross-sectional view taken along line C-C of FIG. 18A of a flow restrictor attachment 90b according to certain aspects of the present disclosure is shown. Proximate the inlet end 97 of the flow restrictor attachment 90b are longitudinally formed perforations 78 that terminate in ports 95 fluidly connectable with a passageway in the flow adjustment ports 94a. When opened, the flow adjustment ports 94a provide fluid communication between the perforations 78 and the flow path 79 via ports 95 and 43, respectively.

As shown in FIG. 18B, the flow path is closed by the plunger 76, which is rotated to a closed position in the bonnet 77. Also shown is the locking nut 75 which maintains the bonnet 77 within the flow adjustment port 94a. The locking nut further includes an overhang 45 that acts as a stop for the plunger 76 so that is may not be completely unscrewed and removed from the bonnet 77. Flow through the flow restrictor attachment 90b may be adjusted by opening or closing individual flow adjustment ports, and/or by the degree to which each flow adjustment port is opened or closed (i.e., port may be partially opened to provide a portion of the flow allowable when fully opened).

Figure 18A:
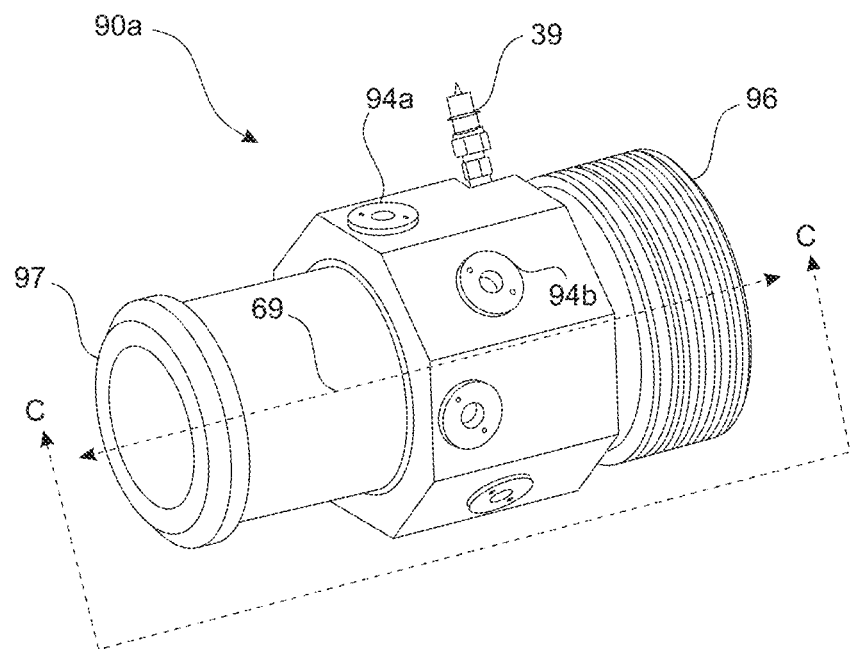
FIG. 18A illustrates a flow restrictor attachment used to provide adjustable pressure decline for a valve in accordance with certain aspects of the present disclosure.
Figure 19A:
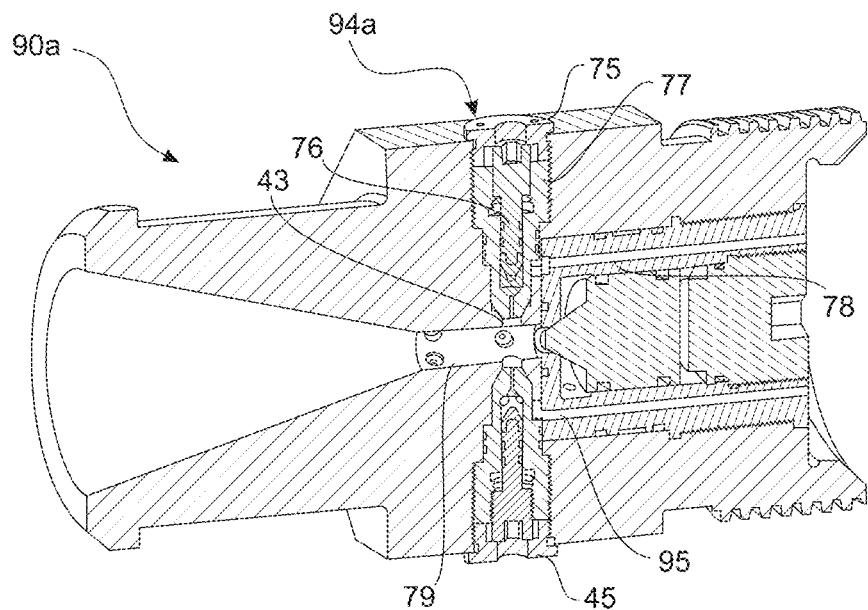
FIG. 19A illustrates a cross-sectional view taken along line C-C of the flow restrictor shown in of FIG. 18A in the fully open state with fluid flow paths highlighted.

With reference to FIG. 19A-19E), various flow paths are depicted in a flow restrictor attachment 90a that includes hydraulic actuation of a secondary flow adjustment port. Shown in FIG. 19A is a cross-sectional view taken along line C-C of FIG. 18A for the flow restrictor attachment 90a rotated 45" relative to the device shown in FIG. 18A (rotated about the longitudinal axis 69). The flow adjustment port 94b is shown, which includes a plunger 76 rotatably engaged within a bonnet 77 via matching threads. The bonnet 77 is likewise rotatably engaged within a port in a body of the flow restrictor attachment 90a via matching threads. Both the plunger 76 and the bonnet 77 are restricted from disengaging from the flow adjustment port 94b via a locking nut 75 having an overhang 45. As detailed above, the overhang 45 acts as a stop for the plunger 76 so that is may not be completely unscrewed and removed from the bonnet 77.

Figure 19B:
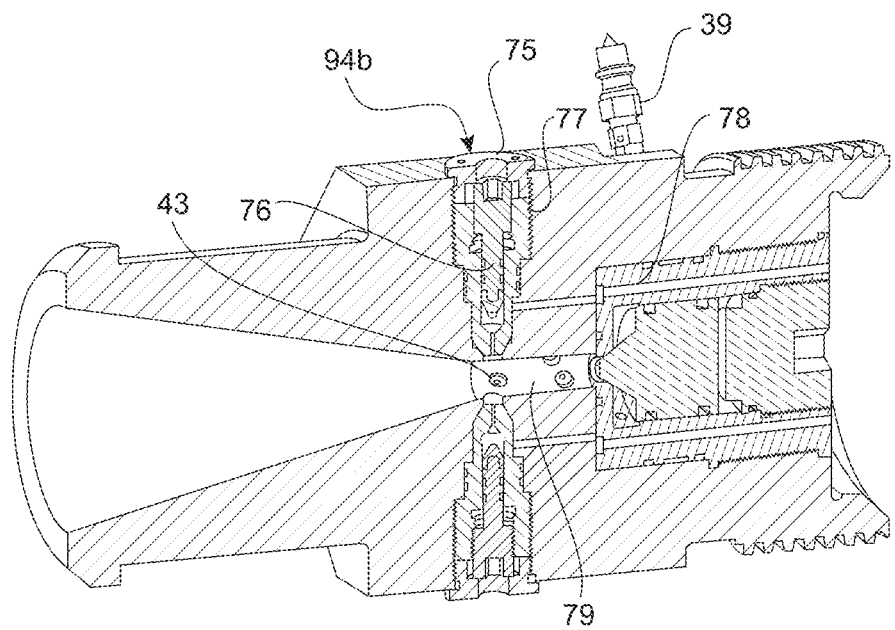
FIG. 19B illustrates a cross-sectional view taken along line C-C of the flow restrictor shown in of FIG. 18A in the fully closed state.

With continued reference to FIG. 19A, the plunger 76 is shown in an open position, i.e., unscrewed in a direction away from the central longitudinal axis 69 of the flow restrictor attachment 90a, thus providing fluid flow through the perforation 78 and flow path 79 as described above (i.e., through pods 95 and 43, respectively). As shown in FIG. 19B, directing the plunger 76 into the bonnet 77, i.e., by screwing the plunger inward toward the central longitudinal axis 69, closes the ports 95 and 43, thus stopping the flow of fluid through the perforation 78 and flow path 79. Individual flow adjustment ports 94b may be opened or closed to modulate the overall flow rate through the flow restrictor attachment 90a.

The unique two-part design of the flow adjustment port(s) (94a, 94b) disclosed herein provides a means to replace the bonnet and plunger when worn due to use, without requiring complete replacement of the flow restrictor attachment 90a.

Note that the cross-sectional view in FIG. 19I–3 is rotated 45° relative to the device shown in FIG. 19A (rotated about the longitudinal axis 69). Also shown in AG. 19B is a charging port 39 for hydraulic fluid (see also FIG. 18A).

Figure 18B:
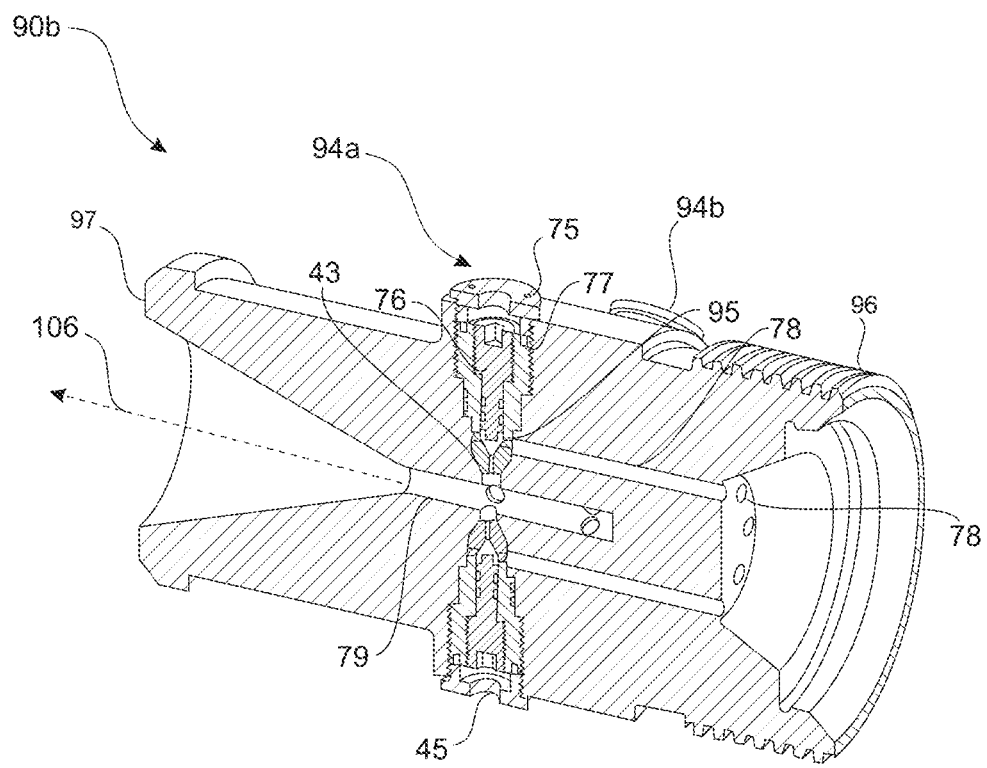
FIG. 18B illustrates a cross-sectional view of a flow restrictor taken along line C-C of FIG. 18A.
Figure 19C:
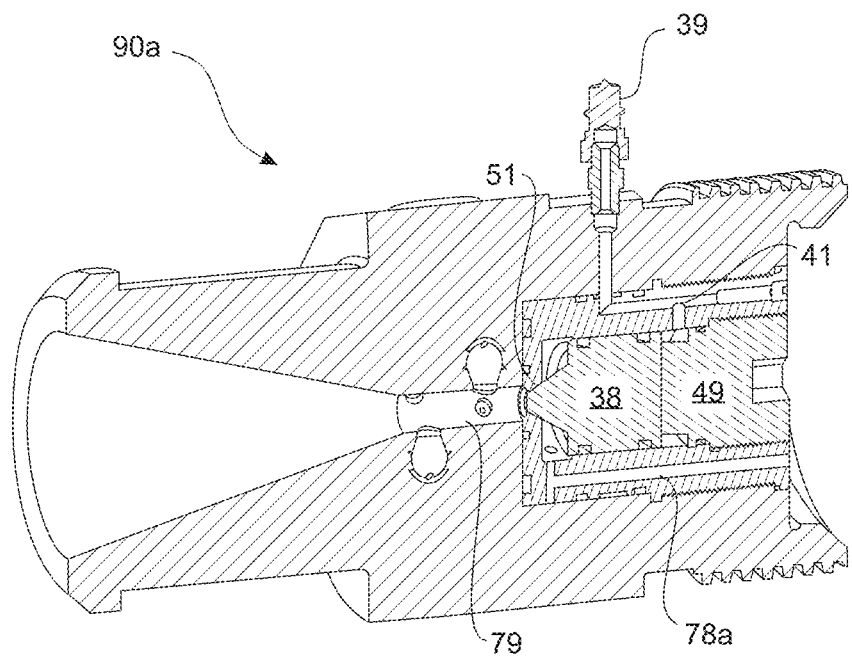
FIG. 19C illustrates a cross-sectional view taken along line C-C of the flow restrictor shown in of FIG. 18A in the open state, as in FIG. 19A, with hydraulic fluid lines highlighted.
Figure 19D:
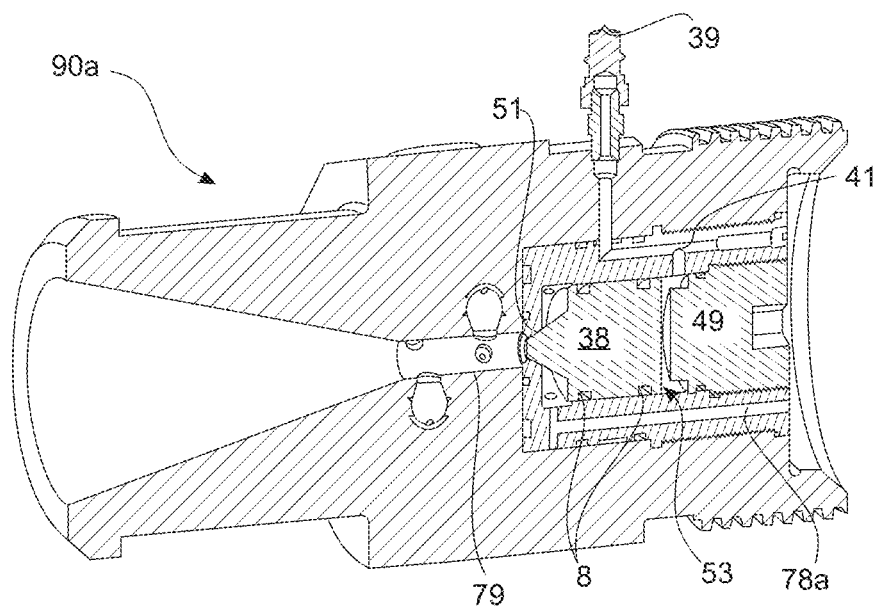
FIG. 19D illustrates a cross-sectional view taken along line C-C of the flow restrictor shown in of FIG. 18A in the open state, as in FIG. 19B, with hydraulic fluid lines highlighted.

With reference to FIGS. 19C and 19D, shown are cross-sectional views of the flow restrictor attachment 90a taken along line C-C of FIG. 18A, wherein the device is rotated 60° with respect to the device shown in FIG. 18k. The cross-sectional view is out of alignment with either of the flow adjustment ports 94a or 94b but is aligned with the charging port 39. As shown in FIG. 19D, hydraulic fluid may be injected through the charging port 39 to a charging pocket 53, forcing a piston 38 to close over a port 51, thus restricting fluid communication between a bypass perforation 78a and the flow path 79. When open, as shown in FIG. 19C, port 51 provides fluid communication between a bypass perforation 78a and the flow path 79. Also shown in FIG. 19D are positions of O-rings or other gaskets (8) that may be included on the piston 38 to provide a fluid tight sea within the flow restrictor attachment 90a. While the piston 38 is shown as formed of a single material, the end adjacent the port 51 may comprise a different stronger material, such as carbide, that may provide increased use-life and durability.

When included on the system 10 of the present disclosure, the flow restrictor attachment 90a may be used to relieve pressure in a main conduit 100. The individual flow adjustment ports may be opened or closed to provide a specific flow volume through the valve to which the restrictor is attached, and thus may provide an adjustable amount of pressure relief from a conduit line when activated. Activation may be enable as discussed herein with respect to valve actuation of any of the previously discussed valves. As a high-pressure event is relieved, the pressure in the main conduit may drop to a point where flow is slowed (e.g., low pressure due to lack of strain on the metal pipes of the main conduit lines). In such a case, additional flow adjustment ports may be opened to drain the main conduit quickly when at lower pressures.

Moreover, port 51 may be opened to provide a free flow of fluid through the bypass perforation 78a and flow path 79. The bypass perforation 78a may be used to prime the pumps, and/or to drain the lines in a lower pressure scenario such as toward the end of a controlled depressurization. That is, as a high pressure in a main conduit is relieved and the pressure drops below a certain low-pressure limit, the amount of time required to fully drain a line may become increasingly long. In such a case, the bypass perforation 78*a* may be opened as described hereinabove to allow free flow of fluid from the lines, thus draining the lines much more quickly.

Figure 20A:
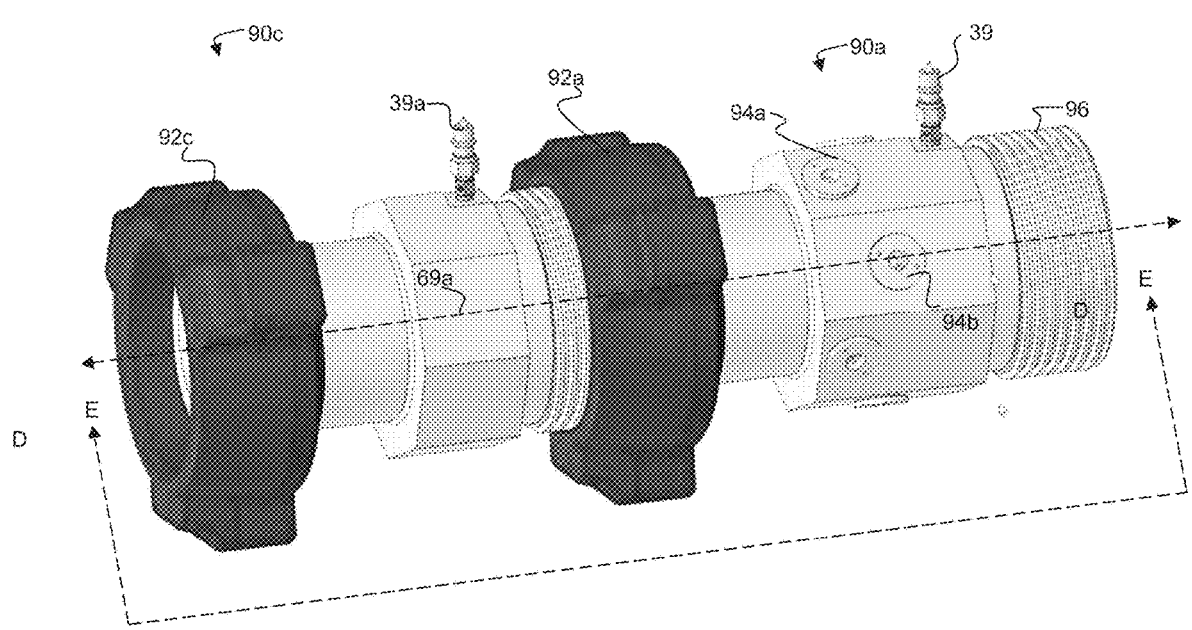
FIG. 20A illustrates a perspective view of a combination non-adjustable, adjustable flow restrictor used to provide instant and/or adjustable pressure decline in accordance with certain aspects of the present disclosure.

The flow restrictor attachment 90*a* may also be combined with a second flow restrictor attachment 90*c* that provides high-pressure relief, such as shown in FIG. 20A. Each of the flow adjustment ports 94*a* or 94*b*, the charging port 39, and the threaded outlet end 96 of the adjustable flow restrictor attachment 90*a* are shown. Attached to an inlet end of the flow restrictor attachment 90*a* is a second flow restrictor attachment 90*c*, securely connected via an attachment ring 92*a*. The second flow restrictor attachment 90*c* includes a charging port 39*a* and an attachment ring 96*c* for connecting the system inline on a fluid conduit.

AGS, 20B and 20C show a cross-sectional view taken along line E-E of AG. 20A of the combined flow restrictor system, wherein the second flow restrictor attachment 90*c* is positioned upstream from the first flow restrictor attachment 90*a*. When positioned inline on a fluid conduit, fluid would flow from the inlet end (proximate to 92*c*) of the second flow restrictor attachment 90*c* to an outlet end 96 of the first flow restrictor attachment 90*a* through a central longitudinal bore therebetween (central bore running along axis 69*a*).

With specific reference to FIG. 20B, the first flow restrictor attachment 90*a* is as described hereinabove, such as with reference to the discussion of AGS. 19A-19D, and positioned as shown in FIGS. 19C and 19D, wherein the cross-sectional view is out of alignment with either of the flow adjustment ports 94*a* or 94*b* but is aligned with the charging port 39. The first flow restrictor attachment 90*a* comprises a sleeve or body 115*a* having an inlet end 97, an outlet end 96, and a longitudinal bore therebetween (i.e., along longitudinal axis line 69*a*). The first flow restrictor attachment 90*a* further includes an insert (49*a*, 49, 38) positioned within the longitudinal bore and sealed against an inner wall thereof. The insert comprises a plurality of longitudinal perforations 78 that provide fluid passage through the longitudinal bore, and a plurality of ports positioned radially through the sleeve (94*a* or 94*b* of Fla 19A), each port in fluid communication with one of the plurality of longitudinal perforations 78. Each port comprises an adjustable plunger (76 of FIG. 19A) configured to move within the port to adjustably restrict fluid flow through a respective longitudinal perforation 78.

The insert further includes a bypass port (end of bore 79 distal from the inlet end of the flow restrictor attachment) configured to provide fluid flow along a bypass perforation 78*a* that circumvents the plurality of longitudinal perforations 78. A hydraulic fluid may be injected through the charging port 39 to a charging pocket 53, forcing a piston 38 to close over a port 51, thus restricting fluid communication between the bypass perforation 78*a* and the flow path 79, as shown in AGS. 20E and 20G.

The second flow restrictor attachment 90*c* includes the same general configuration as the first flow restrictor attachment 90*a*, but lacks the flow adjustment ports (94*a*, 94*b*). Thus, as shown in FIG. 20B, the second flow restrictor attachment 90*c* comprises a sleeve or body 115*a*' having an inlet end (proximal 92*c*), an outlet end 96', and a longitudinal bore therebetween (i.e., along longitudinal axis line 69*a*). The second flow restrictor attachment 90*c* also comprises an insert (49*a*', 49', 38') positioned within the longitudinal bore proximal an outlet end 96' and sealed against an inner wall thereof. The insert 38' comprises a plurality of longitudinal perforations 78*a*' that provide fluid passage through the longitudinal bore, and a piston 38' configured to restrict flow of fluid through the longitudinal bore when in a closed position. The piston 38' may be held in a closed position by a hydraulic fluid injected through the charging port 39' to a charging pocket 53', forcing a piston 38' to close over a port 51', thus restricting fluid communication between the bypass perforation 76*a*' and the flow path 79', as shown in FIG. 20B. When open, as shown in FIG. 20C, port 51' provides fluid communication between a bypass perforation 78*a*' and the flow path 79*a*' to 79*a*. As mentioned hereinabove, while the piston (38, 38') is shown as formed of a single material, the end adjacent the port (51, 51') may comprise a different stronger material, such as carbide, that may provide increased use-life and durability.

Generally, the inlet end of the first flow restrictor attachment 90*a* may be connected to the outlet end of the second flow restrictor attachment 90*c*, wherein the combined flow restrictor system is connectable inline on a fluid conduit such that fluid flow is from the inlet end of the second flow restrictor attachment 90*c* to the outlet end of the first flow restrictor attachment 90*a*. As such, the piston of either or both of the first and second flow restrictor attachment may open responsive of a high-pressure condition. For example, both pistons may be closed during normal operation with the flow restrictor system positioned inline on a bypass conduit. Should an overpressure event occur, the piston of the second flow restrictor attachment 90*c* may open to provide fluid flow through the flow restrictor system. The rate of flow through the system would be controlled by positions of each of the plungers 76 in the adjustment ports (94*a* or 94*b*). Should the flow rate need to be increased rapidly, the piston 38 of the first flow restrictor attachment 90*a* could be opened to provide fluid flow through the bypass port (79, 78*a*). When the system has relieved pressure in the conduit, the piston 38' of the second flow restrictor attachment 90*c* may be closed (e.g., when the pressure is equalized).

Alternatively, if a fluid conduit is being drained, the rate of flow through the system could be controlled when a high-pressure condition exists by positions of each of the plungers 76 in the adjustment ports (94*a* or 94*b*), When the system pressure is reduced, the piston 38 of the first flow restrictor attachment 90*a* could be opened to provide faster fluid flow through the bypass port (79, 78*a*), thus draining the last fluid from the lines when at low pressure more rapidly (typically a time consuming process). That is, as a high-pressure event is relieved, the pressure in the fluid conduit may drop to a point where flow is slowed (e.g., low pressure due to lack of strain on the metal pipes of the main conduit lines). In such a case, additional flow adjustment ports may be opened to drain the main conduit quickly, and/or the bypass port may be opened (i.e., open piston to allow flow through the bypass ports). when at lower pressures.

As mentioned above, the piston of either or both of the first and second flow restrictor attachment may open responsive of a high-pressure condition. The piston may open when the hydraulic fluid in passage 53 or 53' is removed, and/or when the pressure in the fluid conduit exceeds the pressure of the hydraulic fluid in the passage 53 or 53'. Accordingly, the flow restrictor system may comprise a pressure sensor, such as any of the pressure sensors disclosed herein. The pressure sensor may detect a fluid pressure in the fluid conduit and may communicate that pressure to either or both of an electronic circuitry attached to the flow restrictor system or an external circuitry. Thus, responsive of an electronic signal indicating a high-pressure condition in the fluid conduit, either the second flow restrictor attachment 90c or the first and second flow restrictor attachments (90a and 90c) may open the piston to allow fluid flow therethrough as described hereinabove.

Figure 20B:
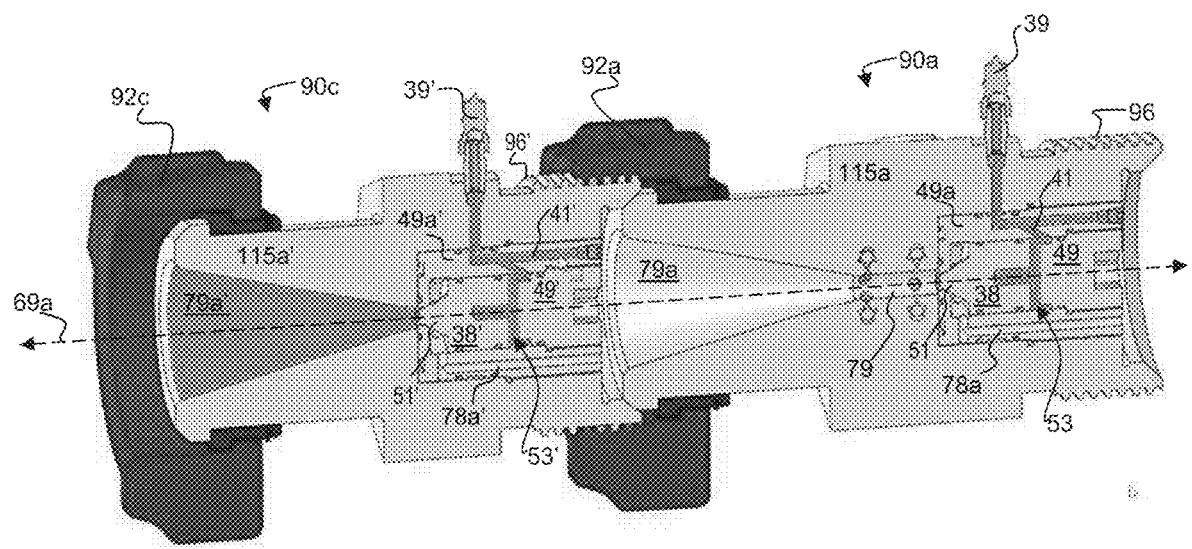
FIG. 20B illustrates a cross-sectional view taken along line E-E of the combination flow restrictor shown in FIG. 20A, wherein both flow restrictors are in the closed state.
Figure 20C:
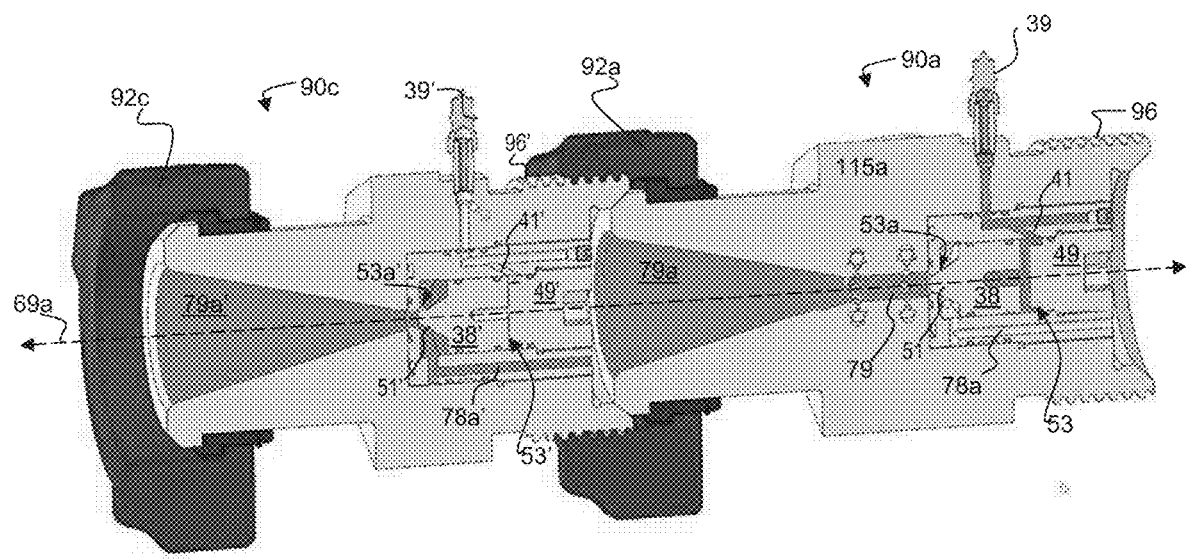
FIG. 20C illustrates a cross-sectional view taken along line E-E of the combination flow restrictor shown in FIG. 20A, wherein the non-adjustable flow restrictor in the open state and the adjustable flow restrictor is in the closed state.

With continued reference to FIGS. 20B and 20C, the insert of either or both of the first and second flow restrictors comprises an outer sleeve (49a, 49a', respectively) that seals the insert against the inner wall of the flow restrictor. As shown, the piston (38, 38') is positioned within the outer sleeve and maintained therein by a stop (49, 49') removeably positioned within the outer sleeve. The plurality of longitudinal perforations (78, 78a, 78a') may be positioned within the outer sleeve of the insert.

The combined first and second flow restrictor attachments (90a, 90c), i.e., the flow restrictor system, may be included as part of any of the systems disclosed herein, i.e., those including one or more valves and any of the systems shown in FIGS. 23-26, and/or may be used as a standalone unit. As such, the flow restrictor system provides a means to relieve pressure in fluid lines using a much smaller, lighter weight, and less complex unit. In this latter case, i.e., when used as a standalone unit, no actuators would be required, and only one or two small hydraulic fluid units and an optional small accumulator may be needed to pressurize the pistons (38, 38'). As such, the overall footprint and weight of the system would be greatly reduced. High-pressure parts, electrical, and hydraulic equipment could all be provided in a small cabinet positioned with the flow restrictor system, such as on a small platform or skid (i.e., similar to cabinets shown in FIGS. 2-5 but greatly reduced in size as no valves need be included).

Components of an exemplary standard system, such as shown in FIGS. 2-5, and a smaller standalone system, such as one useful for implementations that include the combined first and second flow restrictor attachments (90a, 90c) discussed above with reference to FIGS. 20A-20C are listed in Table 1.

Figure 21:
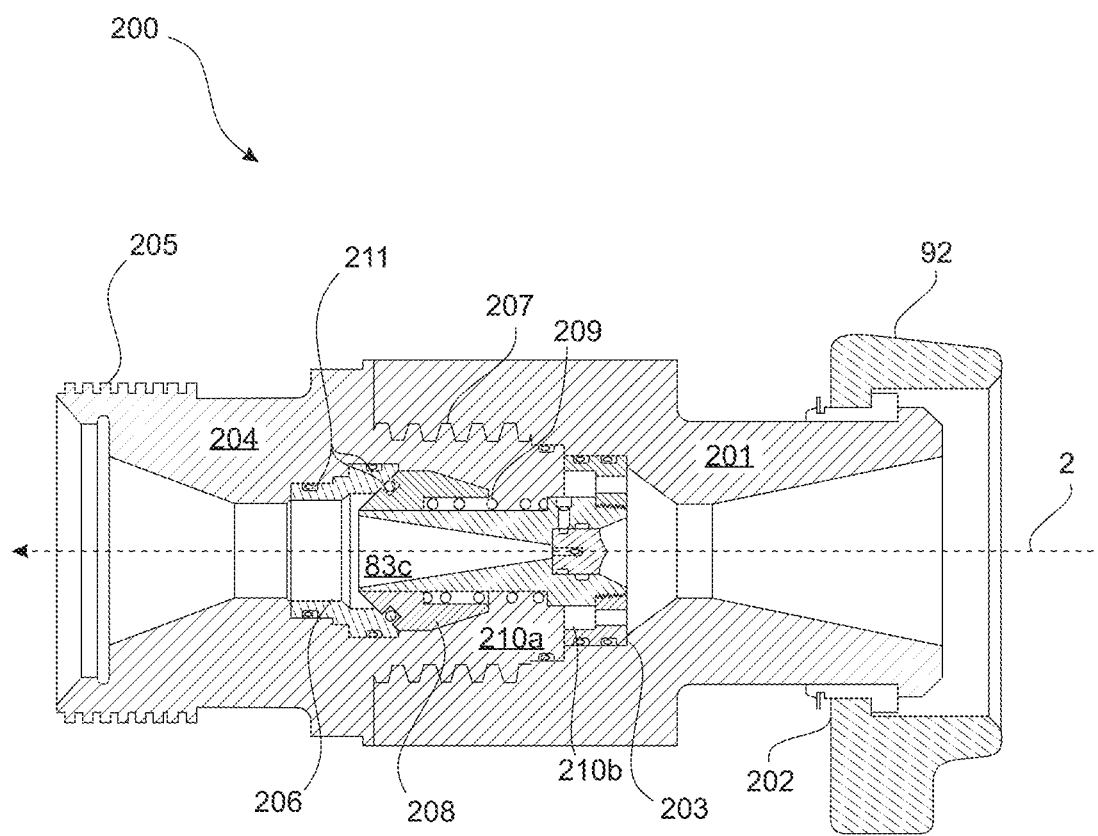
FIG. 21 illustrates a cross sectional view taken along line A-A of FIG. 9 of the valve housing of a bleed through valve system in accordance with certain aspects of the present disclosure.

With reference to 19G, 21, a bleed through flow restrictor 200 is shown that may provide flow of fluid in either direction. In certain circumstances, high pressure fluid lines may be filled for longer term storage or to remove any air from the lines prior to use of the system (purge air from the system prior to activation of the pumps). As example, if left unused the lines of a system may need to be either fully drained or filled with a salt solution so that they do not freeze. In such a case, a valve that may allow fluid to be pumped into the lines up to a preset pressure is desirable. Shown in FIG. 21 is a bleed through flow restrictor 200 having an upstream connection 92 and a downstream connection 205. The bleed through flow restrictor 200 may be connected to the downstream connection (e.g., 87' or 87) of a valve via a joining means, e.g., via an attachment ring 92 having an internal thread configured to mate with the external thread of the downstream connector 24. The bleed through flow restrictor 200 may further include a downstream connection 205 configured for connection to a conduit. The bleed through How restrictor 200 may be designed to include an integral flow restrictor according to any of the designs disclosed herein (83a, 83b, 83c) or may, be designed with a removeable flow restrictor insert (e.g., insert 99 shown in flow restrictor 83c), such as shown in FIGS. 14-16.

TABLE 1

| Component | Standard System | Standalone system |
| --- | --- | --- |
| Battery | 10 day; 4 × 6 v dc battery backup | 12 hr; 1 or 2 battery system |

TABLE 1-continued

| Component | Standard System | Standalone system |
| --- | --- | --- |
| Pressure Transducers | 3 Pressure transducers | 1 or 2 pressure transducers (3 when used as relief as well as bleed down) |
| Valve | Redundant ball valve | Field replaceable poppet style valve |
| Hydraulic Fluid | Large volume oil tank | Smaller volume oil tank |
| Hydraulic Pumps | Large pump for 3" ball valve actuators; pistons in flow restrictors | Small pump for piston in flow restrictor |
| Computer system | Fully programmable wireless touchscreen with unit recognition | Utilize original remote control of RAT/BAT (less features) |
| Overall Weight | >4000 lbs | <1000 lbs |

Alternatively, the bleed through flow restrictor 200 may be connected to the upstream connection 86 of a valve via a joining means, e.g., via the attachment ring (upstream connector 23) having an internal thread configured to mate with the external thread of the downstream connection 205. Also shown in FIG. 21 is a gasket 202 included on the upstream connection 92 that provides a liquid-tight seal on connection with any of the corresponding connection means detailed herein. Similar gaskets are shown in each of the upstream connections 92 shown in FIGS. 10, 11, 13, 16, 17A, and 17B.

The bleed through flow restrictor 200 includes a downstream connection 201 threadedly connectable to a flow restrictor attachment 204 that may hold any of the flow restrictors disclosed herein (83a, 83b, 83c) or may be designed with a removeable flow restrictor insert (e.g., insert 99 shown in flow restrictor 83c). The flow restrictor attachment 204 may further include an upstream seat 206 that seals against an inner surface of the flow restrictor attachment 204 and an end of an upstream valve plug 208 via gaskets 211 or the like. The upstream valve plug 208 may partially encase a spring 209 and a flow restrictor, such as any of the any of the flow restrictors disclosed herein (83a, 83b, 83c).

During standard operation, the bleed through flow restrictor 200 may provide flow in the direction of arrow 2 when a valve is opened, such as during any of the high-pressure events disclosed herein. However, the bleed through flow restrictor 200 further provides for flow of fluid opposite from the direction of arrow 2, such as into the fluid lines on which the restrictor is attached (e.g., 100, 5, etc.). That is, fluid directed in a direction opposite of the arrow 2 may push against the upstream valve plug 208 forcing the spring 209 into a retracted position, and thus opening the space 210a surrounding the flow restrictor 83c to fluid flow. The fluid may then pass through ports 210b in the downstream plug 203 and into the downstream connection 201, and the fluid lines. Once the lines are filled, such as with a salt solution, the valve (26) may be closed to prevent fluid exit from the system (i.e., back in the direction of arrow 2).

With reference to FIGS. 21A and 21B, an unbalanced poppet 300 is shown that may be included as a safety measure for any of the systems disclosed herein. For example, the unbalanced poppet may be included on pressure lines on an outside wall casing of a down bore. Should an inner casing of the bore fail, the extremely high-pressure fluids contained therein will exit the system at near supersonic speeds. When attached to lines near the exit of the bore, the unbalanced poppet may provide an emergency safety pressure release that would not only save the wellhead but may, reduce strain on all downstream equipment.

Figure 22A:
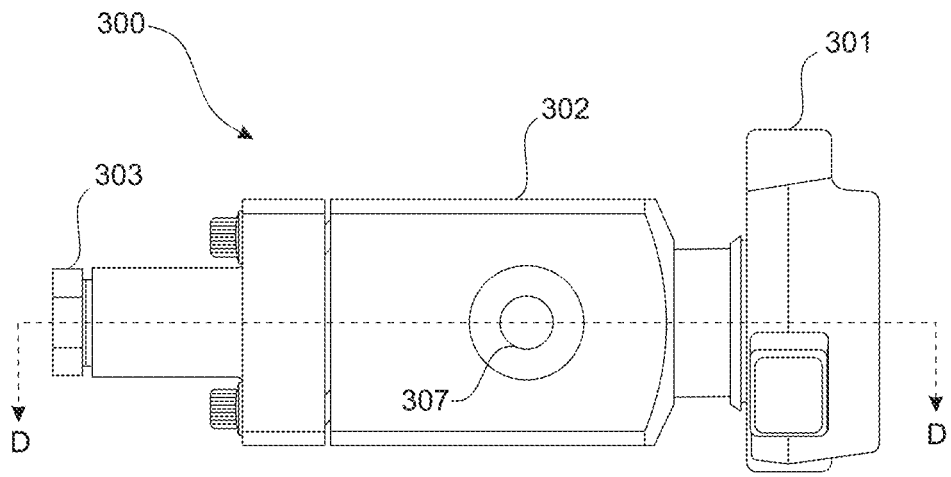
FIG. 22A illustrates an unbalanced poppet in accordance with certain aspects of the present disclosure.

With specific reference to FIG. 22A, the unbalanced poppet 300 may be attached to a fluid line via a joining means, e.g., via an attachment ring 301 having an internal thread configured to mate with the external thread of the downstream connector. Alternatively, the connection may be via an external thread on an end of the unbalanced poppet 300 connectable to an attachment ring on the fluid line. As shown, the unbalanced poppet 300 comprises a main body 302 having an exit port 307 and a valve head 303.

Figure 22B:
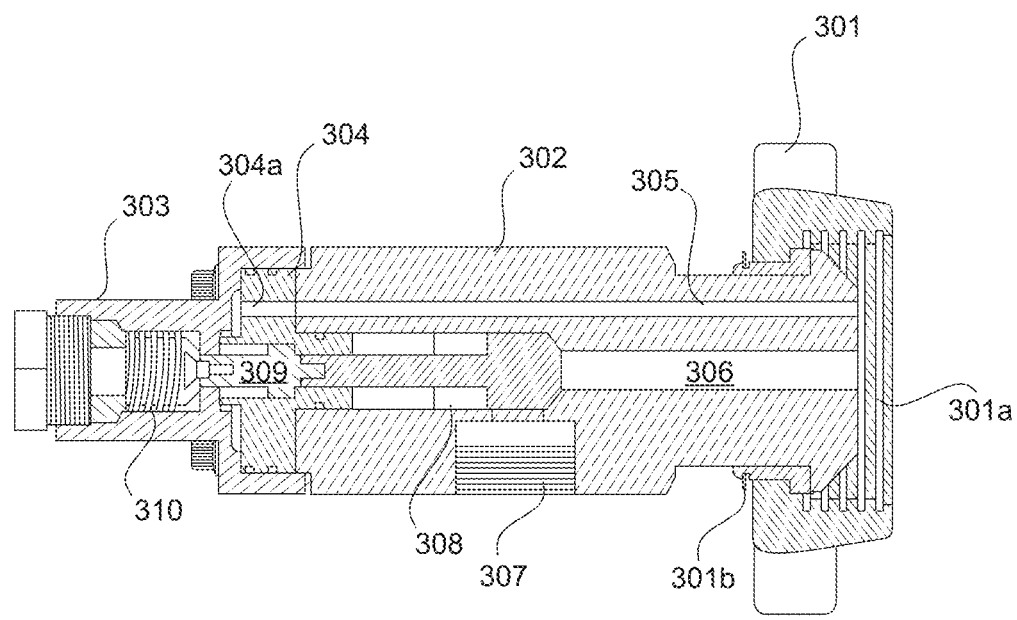
FIG. 22B illustrates a cross-sectional view taken along line D-D of the unbalanced poppet of FIG. 22A.

With reference to FIG. 22B, which shows a cross-sectional view of the unbalanced poppet 300 taken along line D-D, the main body includes a main bore 306 and a bypass bore 305 to provide "unbalanced" flow of fluid therethrough. Within the main bore 306 lies a plug 308 that maintains the bore in a closed position so that no fluid may flow through the main bore 306 and out the exit port 307. Additionally, flow of fluid through the bypass bore 305 pushes fluid through a port 304a in an upstream seat 304 that pressurizes a space behind plug 309, and thus maintains the plug 308 in the closed position as shown in FIG. 22B. As pressure in the line increases, such as during an extreme overpressure event or failure of a casing at a wellhead, the balance of pressure through the main and bypass bores changes so that the plug 308 may be pushed out of the way of the flow path 306-307 by compression of the spring 310 within the valve head 303. Moreover, various expected pressure events may be corrected by correctly gauging the spring force of the spring 310 and the comparative diameters of the main 306 and bypass 305 bores.

While the unbalanced poppet 300 of FIGS. 21A and 21B has been described with reference to use in oil and gas drilling operations, it specifically as a safety measure useful in systems including any of the valves and/or valve systems disclosed herein, it may find use as a standalone component. Moreover, the unbalanced poppet 300 may be useful to vent overpressure events from any system under pressure, such as in municipal water treatment facilities. Additionally, while described as useful for system comprising fluid lines, the unbalanced poppet 300 may find use in systems that comprise gas under high pressure, such as on top of a gas separator, wherein the pressure release may vent gas to the atmosphere or as a gas flare.

According to certain non-preferred aspects, a reduced diameter portion of the system that could be used to provide metered or controlled pressure relief could be provided externally on the fluid line. For example, a reduced diameter portion of the system may be provided by an externally positioned valve, such as a pinch valve, that is automatically operated by a solenoid to compress or reduce the diameter of an upstream or downstream section of the bypass conduit (5b of FIG. 1). In this way, the amount of flow restriction through the bypass lines may be variable and controllable. Additional sensors, such as pressure and/or flow sensors, may be included to determine a change in the pressure and/or flow rate when the automatic valve is used, and this information may be transmitted to the control system 40 of the system 10. Alternatively or additionally, the externally positioned valve may be manually operated when positioned downstream (i.e., in scenarios when the fluid line is under zero pressure).

According to certain aspects of the present disclosure, the valve assembly may be configured to provide a rapid reduction in the pressure within a main conduit 100. As shown in FIG. 10, the downstream connection 87 may have an internal bore diameter that is substantially the same as, or larger than the diameter of the throughbore on the ball 26 and the upstream connection 86. In this way, opening of the valve may provide nearly instantaneous reduction of pressure in a main conduit 100 to which the system is attached.

Alternatively, or additionally, the system 10 may include one or more valve assemblies that may be configured to provide a controlled or metered pressure relief, such as the valves having flow restrictors contained therein (e.g., 83a, 83b, 83c) or the flow restrictor attachments (e.g., 90a, 90b) or the bleed through flow restrictor 200.

The system may further include the unbalanced poppet 300 positioned adjacent the well head and configured to provide overpressure relief for extreme overpressure events, such as failure of an inner well casing.

The system may further include one or more batteries to power the control system 40 and the valve actuation system 30. These batteries may be rechargeable battery cells. Further, the batteries may include a charge sensor configured to sense a charge state of the at least one battery cell, and a circuit electrically connected to the charge sensor for receiving a signal indicative of the charge state of the at least one battery cell. Additional sensors may be included which register a temperature, voltage, current, etc. of the at least one battery, and such information (data) may also be relayed via a circuit to the control system 40, and may be shown visually on the voltmeter 66 and/or charging indicator lamp 67. The battery may also indicate the charge status by an audible signal that may change (e.g., start at a certain charge state, grow louder and/or increase frequency of signal, etc.) as the battery is progressively discharged (for example an alarm as shown in FIG. 6 at 120 on the control system 40).

When more than one battery cell is included, each individual battery may include a charge sensor (and optionally additional sensors), which may communication via individual circuits, or may communicate directly, to a battery management system. Such a system manages a rechargeable battery (cell or group of cells), such as by protecting the battery from operating outside its safe operating area, temperature, voltage, etc. and by monitoring its state, calculating secondary data, reporting that data, controlling its environment, authenticating it and/or balancing the usage of individual cells in a groups of cells.

The at least one battery may further include a connection means for an external power source which may provide for recharging of the at least one battery cell. For example, the external power source may be provided by AC power from a combustion engine generator equipped with a GFCI outlet, and the connection means may include a standard power cord. Alternatively, the external power source may be provided by a battery docking station which acquires power from an AC power source. The battery docking station may provide power to the battery via direct contact between one or more electrical charging contacts. The battery docking station may provide power to the battery wirelessly. Moreover, more than one means for recharging may be included on the battery.

As detailed above, according to certain aspects of the present disclosure, the system may be include two or more valve assemblies, such as two or more ball valves actuated by two or more scotch yoke actuators, wherein each valve assembly includes a valve position sensor and an indicator light assembly. The system may further include a control system, and a source of actuation fluid and pumps to pressurize the actuation fluid. These components may be included in a frame which may be transportable, such as a road transportable frame. According to certain aspects of the disclosure, the system may further include at least one fluid catch tank to receive the fluid released when the relief valve system is opened, and at least one tank level probe to monitor a liquid level in the fluid catch tank. The system may also include tank mounted fluid diffusers that control input of fluid from either or both of the valve outlets (e.g., at the valve outlet, or at an end of a bypass line attached to the valve outlet—5b) to the fluid catch tank.

According to certain aspects, each valve assembly of the system may be the same or may be different. For example, a system according to the present disclosure may include any of a valve configured for rapid relief of an over-pressure event in a conduit, a valve configured for controlled or metered pressure reduction, a valve configured to allow both forward and back-flow through the system, or any combination thereof.

The frame of the system may include a mount for the control system, and may optionally include vibration isolation on the mount to lessen the impact of vibrations from the valve assembly on the control system 40. The control system 40 may provide electronic control of the hydraulic actuator (hydraulic control circuit), and receive feedback from each of the pressure sensors. In certain embodiments, up to four pressure sensing assemblies may be included, wherein each pressure sensor includes at least two pressure transducers, such as three pressure transducers. Thus, the control system may be configured to receive data from more than one pressure sensor (i.e., and pressure transducer).

The control system may be a remote electronic user interface that may provide control of the valves, such as by setting high and low pressure set-points. Moreover, the user interface may also provide instant interaction with the valves, such as opening and closing of the valves. The control system may store data related to the sensed pressures, valve opening and closings, etc., which may be output visually on a display panel of the control system or electronically (via direct wired or wireless connection) to another user device (remote).

The system may be powered via a direct AC or DC connection, such as via a rechargeable battery. The batteries may be used to power the control system, the sensors, and the hydraulic actuator. In certain instances, the batteries may also be used to power other optional components, such as fluid circulation pump circuits, throttles for the actuators, piping system heaters, and electrical lighting. Moreover, the control system may be electronically linked to each of these additional optional components to provide control for each.

The various components discussed hereinabove may be combined to create an architecture for the system that has complete independent control of both valves and their respective positions and may interpret two independent pressurized fluid conduits. The system may be incorporated into various high pressure conduits, such as those used in hydraulic fracturing or wellbore completions operations. For example, when included in such an operation to provide pressure adjustment and control for a single conduit, a first end of a first bypass conduit may be attached to the upstream connector 23 of the valve assembly 20 of a first valve assembly, and a second end of the first bypass conduit to the main conduit 100, and a first end of a second bypass conduit may be attached to the downstream connector 24 of the valve assembly 20 of the first valve assembly. At least one pressure chamber 52 may be attached on the main conduit 100, such as any of those disclosed herein.

If the valve is to be used to bleed or reduce the pressure in a main conduit 100, such as after a pressure test, a valve connector or insert may be selected that includes a reduced diameter section or perforations as discussed hereinabove, i.e., any of the flow restrictors (e.g., 83a, 83b, 83c) or the flow restrictor attachments (e.g., 90a, 90b) or the bleed through flow restrictor 200. Selection may be based on the desired reduction of pressure in the line. As such, the control system 40 may initiate opening of the valve 26 so that fluid may exit the system through the bypass lines (5a, 5b of FIG. 1) and through the selected valve connector or insert. Pressure may be tested both before and after opening of the valve, and these values may be recorded.

If the valve is to be used as a rapid pressure loss valve, high- and low-pressure limits may be set on the control system 40. These may be set by the user, or may be preset based on a standard type of service on a standard type of high pressure conduit. Moreover, a user may start with present values and make changes thereto based on adaptations to the high pressure conduits, current environmental conditions, etc.

The high and low pressure limits may be those known in the industry of use. For example, in the hydraulic fracturing industry, the high pressure conduits can be rated to withstand fluid pressures of up to 10,000 psi, or up to 20,000 psi, or even up to as much as 30,000 psi. The high pressure limits may therefore be set based on the rating of the high pressure conduit for which the system may provide pressure loss, and may be set at the rated pressure limit, or below the rated pressure limit. Such settings are known to those of skill in the art. The low pressure limits may be adjusted to be at least 10% below the high pressure limit, such as at least 1,000 psi below the high pressure limit, or at least 2,000 psi below the high pressure limit, or at least 5,000 psi below the high pressure limit, or even 10,000 psi below the high pressure limit.

The control system will then receive signals from the at least one pressure sensor and pressure transducer indicating a fluid pressure in the high pressure conduit, and communicate with the valve actuation system of at least the first valve assembly to change a position of the valve, such that when the fluid pressure in the fluid line exceeds the high pressure limit the valve is opened, and when the fluid pressure in the fluid line falls below the low pressure limit the valve is closed. Alternatively, the signal related to a pressure in the high pressure conduit may be sent from an external device, such as from a pressure sensor of another control system positioned on the same high pressure conduit, or may be from user input.

According to certain aspects of the present disclosure, control logic is implemented by the control system that causes the valve to remain open until a downward trend is registered in the pressure reading(s) after the low-pressure limit has been reached. For example, according to certain aspects of the present disclosure, at least the next pressure reading after the low pressure limit has been reached must also be below the low pressure limit, such as by an amount at least 10% below, or 30% below, or even 50% below the previous pressure reading, after which the valve may reclose. According to certain aspects of the present disclosure, the downward trend may include at least the next pressure reading after the low-pressure limit has been reached, or the next two or more pressure readings after the low-pressure limit has been reached.

Additional valve assemblies may be attached to provide pressure control or relief for the same high pressure conduit. That is, a first end of a third bypass conduit may be attached to the upstream connector of the valve housing of a second valve assembly, and a first end of a forth bypass conduit may be attached to the downstream connector of the valve housing of the second valve assembly. The high pressure limit and low pressure limit for this second valve assembly may be set using the user interface on the control system, wherein the control system is configured to communicate with the valve actuation system of the second valve assembly to change a position of the valve. In this scenario, the first, second, third, and forth bypass conduits are all portions of a single bypass line having a connection to the same high pressure conduit.

Alternatively, the additional valve assemblies may be attached to provide pressure control or relief for a different high pressure conduit. In this scenario, the first and second bypass conduits would be portions of a first bypass line having a connection to a first high pressure conduit, and the third and fourth bypass conduits would portions of a second bypass line having a connection to a second high pressure conduit.

In any of the methods discussed herein, additional pressure sensors may be used. As such, additional pressure chambers of a second, or third, or greater pressure sensor may be attached on the first or second fluid line such that an outward facing side of the diaphragm is in contact with a fluid in the fluid line, or inline on the first or second fluid line to provide flow-through pressure sensing on the lines. In this scenario, the control system may receive signals from each of the additional pressure sensors indicating a fluid pressure in the high pressure conduit to which it is attached. The control system may then use this data to control positions of the various valves in the system.

Figure 23A:
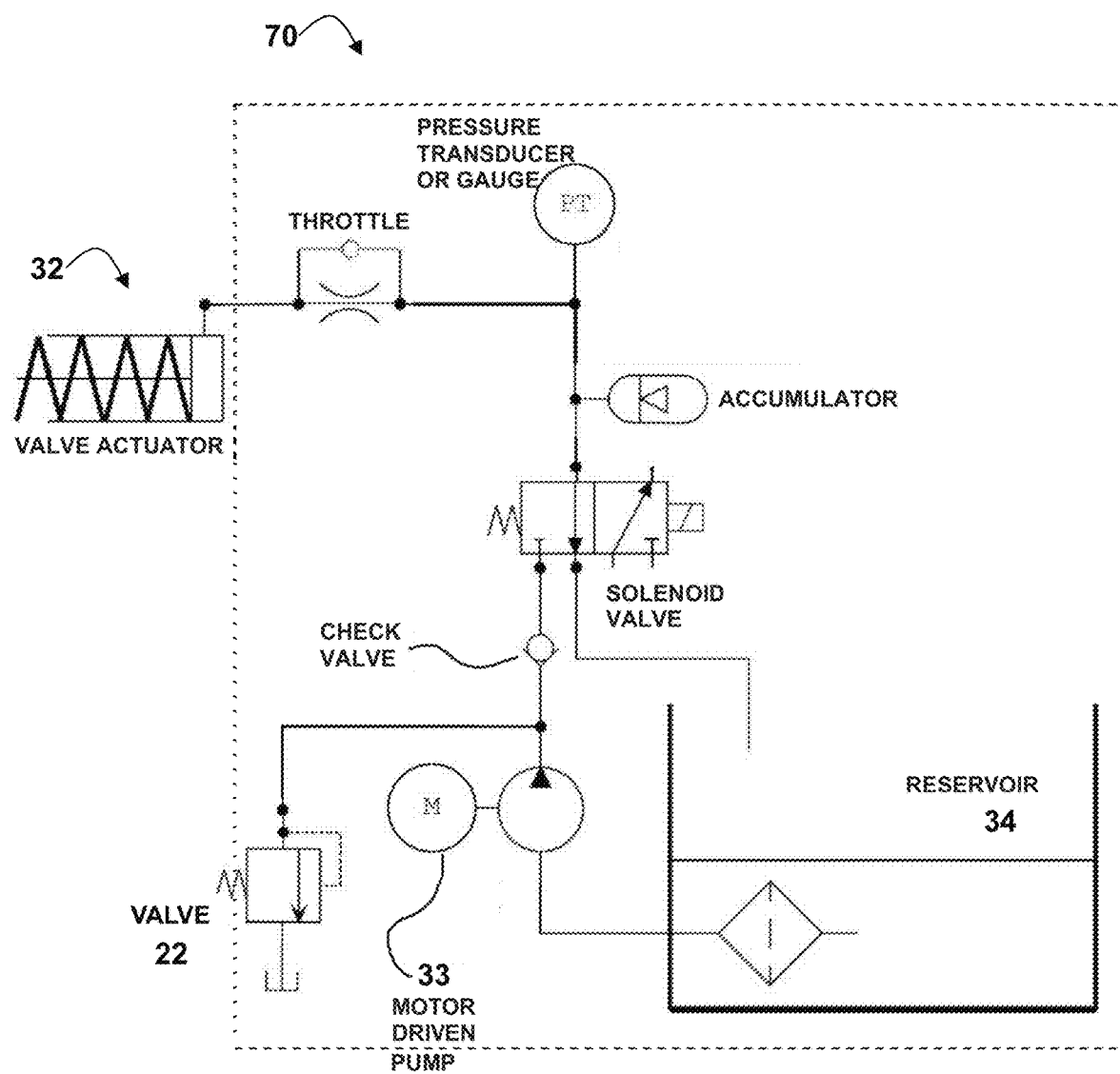
FIG. 23A is a schematic showing hydraulic control of the valve system actuation in accordance with certain aspects of the present disclosure.

Hydraulic control of the valve actuation according to certain aspects of the present disclosure is shown in FIG. 23A. The valve actuator 32 may be controlled by various components of a hydraulic control system 70, which include one or more valves to control and direct communication between a motor driven pump 33, a hydraulic fluid reservoir 34, and the relief valve 22. The one or more valves may include a solenoid valve, a check valve, and/or any other type of valve operable to open and close, or direct, the fluid circuits between the pump 33, the hydraulic fluid reservoir 34, and the relief valve 22, The hydraulic control system 70 may include one or more gauges, such as a pressure transducer or gauge which can be visually inspected to monitor the pressure in the flow lines (note: this is a pressure transducer that registers pressure in the valve actuation chamber, and is not the same pressure transducer shown in AGS. 7 or 8 and labelled as 50/52 in FIGS. 1, 7, 8, and 2346). According to certain aspects of the present disclosure, the pressure gauge may be configured to shut off the motor driven pump 33 when the pressure in the actuator 32 of the relief valve 22 reaches a pre-determined pressure setting. The one or more valves may also be controlled by the control system 40 as detailed above.

Figure 23B:
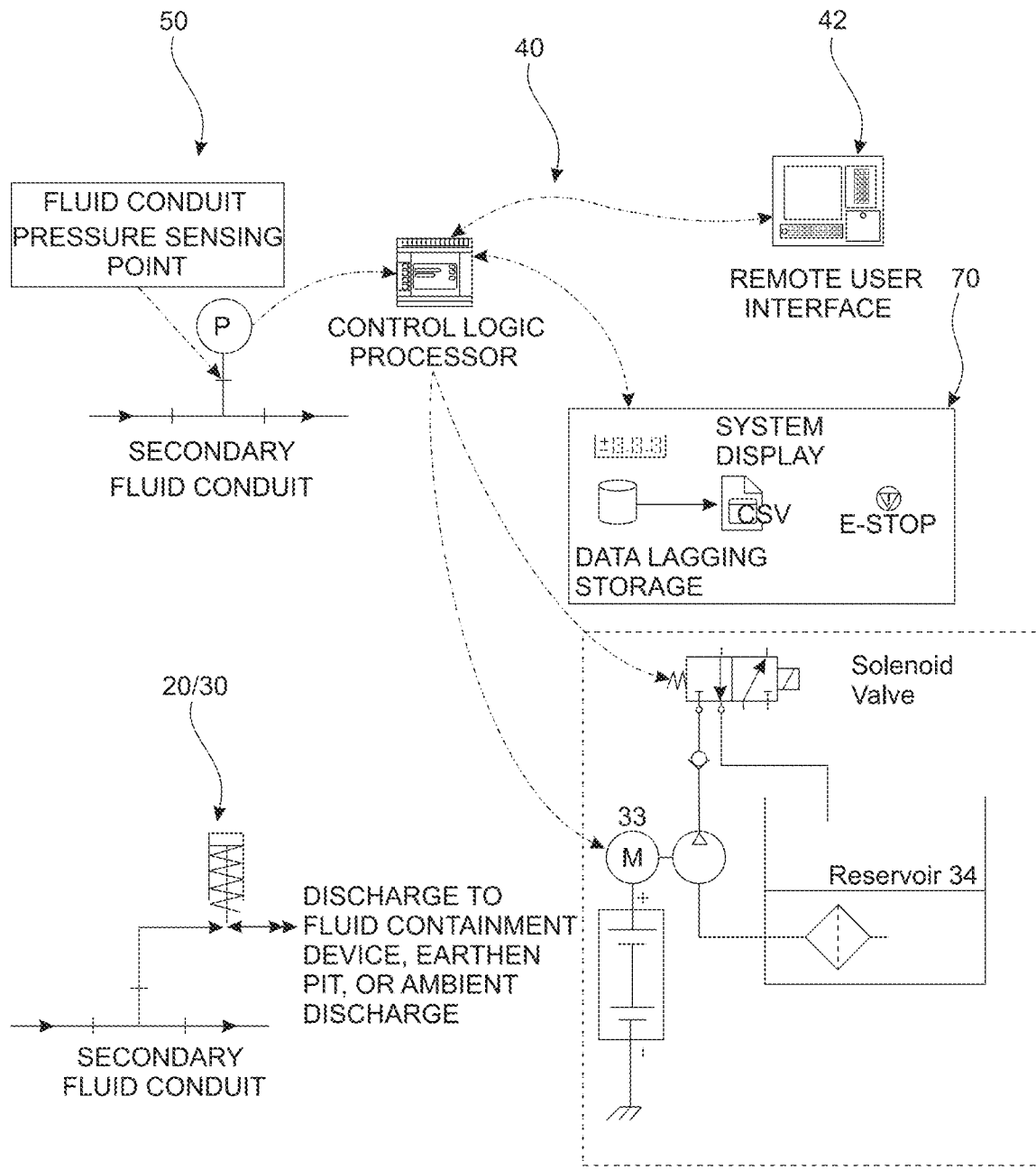
FIG. 23B is a schematic showing the relationship of major subassemblies of a valve system in accordance with certain aspects of the present disclosure.

The relationship between major subassemblies of the present system according to certain aspects of the present disclosure is shown in FIG. 23B. A fluid sensing point (50) which may include a pressure sensor comprising a diaphragm as detailed above, may be positioned on a secondary or bypass fluid line, wherein the bypass fluid line is attached at an upstream point to the main high pressure conduit. Also shown are the control system 40 and the remote user interface 42. The relief valve assembly (20/30) may also be positioned on the same or a different secondary or bypass fluid line. Another embodiment of the hydraulic control system 70 as detailed in FIG. 23A is shown, wherein a motor driven pump 33, hydraulic fluid reservoir 34, and solenoid valve are included. The solenoid valve assembly may be in communication with the control system 40 to control operation (e.g. open and close) of the valve assembly (20/30) to thereby control actuation of the valves as desired.

Figure 24:
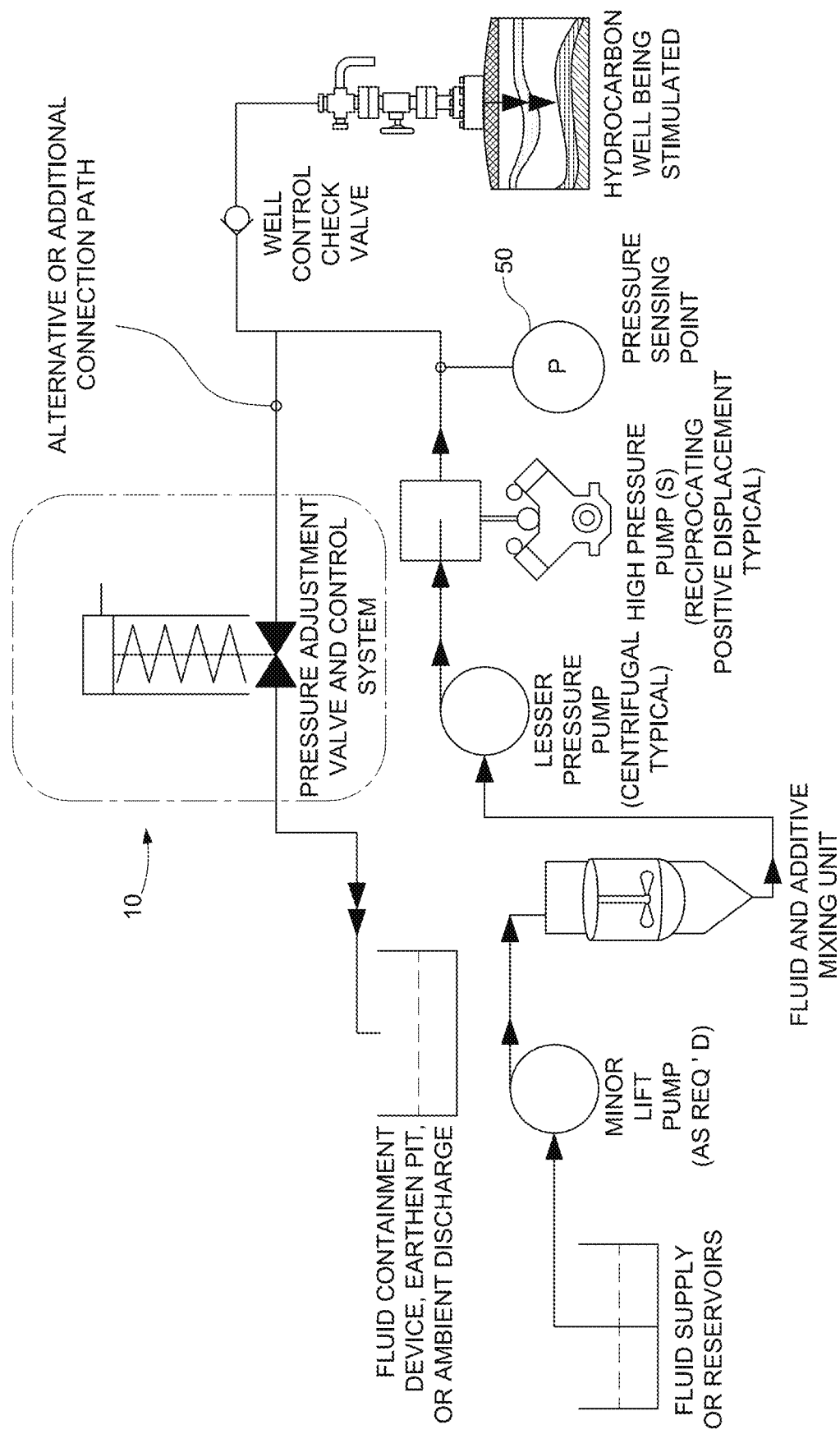
FIG. 24 is a schematic showing a valve system positioned to control the pressure contained within a hydraulic fracturing system in accordance with certain aspects of the present disclosure.
Figure 25:
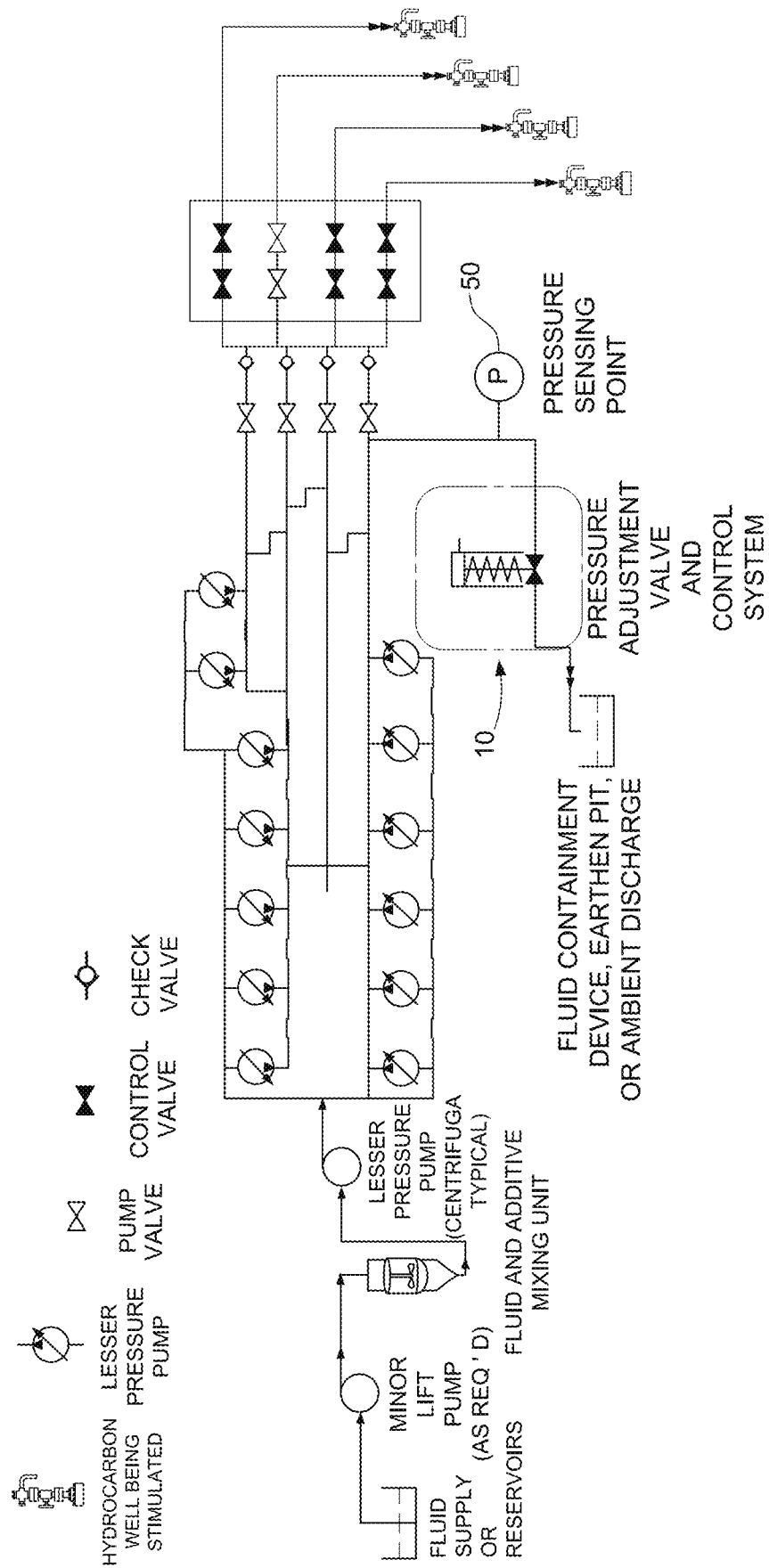
FIG. 25 is a schematic showing a valve system positioned to control the pressure contained within a hydraulic fracturing system on a multiple well location in accordance with certain aspects of the present disclosure.
Figure 26:
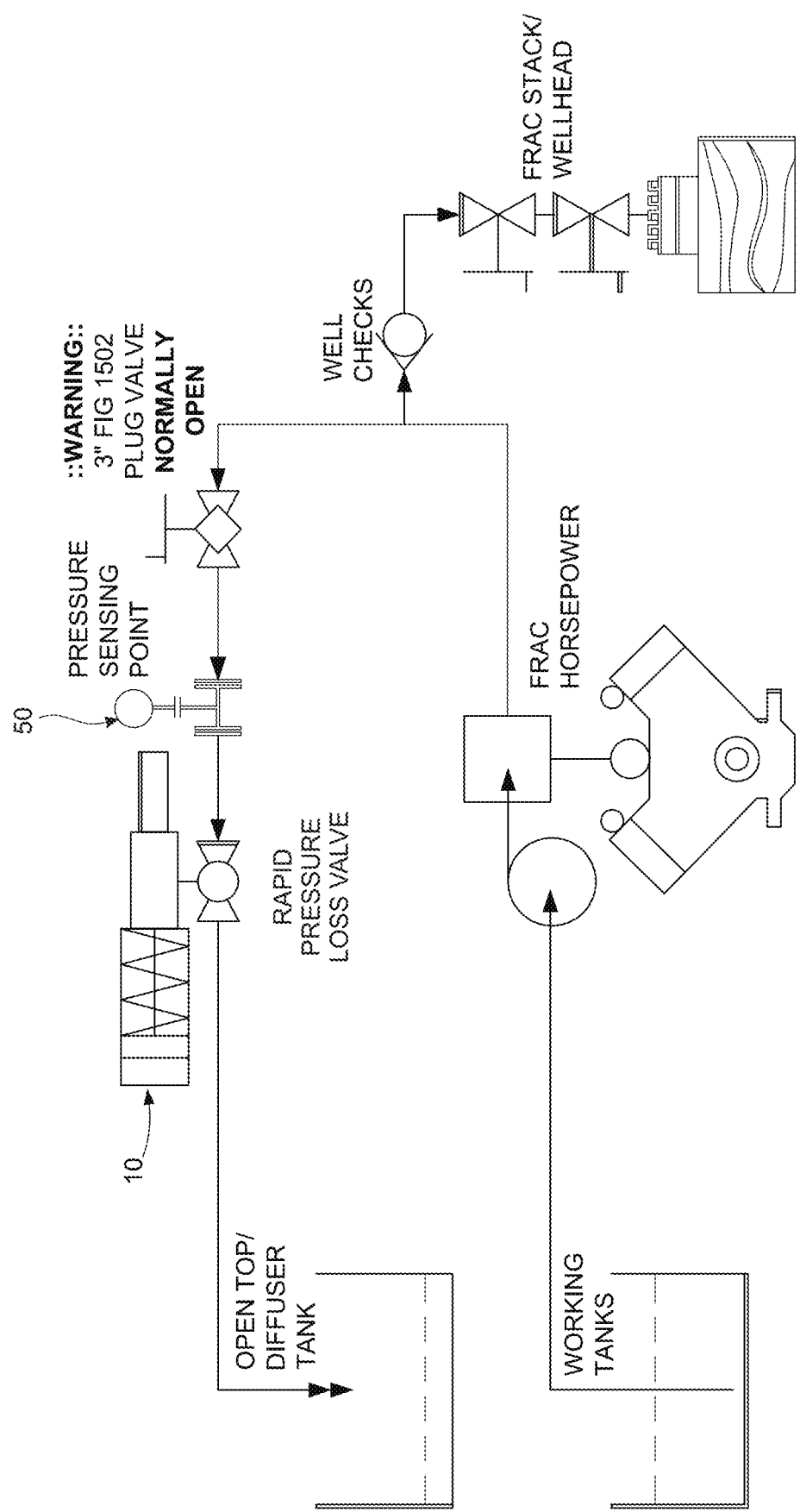
FIG. 26 is a schematic showing a valve system positioned to provide rapid pressure loss within a hydraulic fracturing system in accordance with certain aspects of the present disclosure.

Various exemplary placements of the systems 10 of the present disclosure are shown within standard hydraulic fracturing or wellbore completion operations in FIGS. 24-26.

The following aspects are disclosed in this application:

Aspect 1. A system for pressure control in a fluid conduit, the system comprising: at least two valve assemblies, each valve assembly comprising: a valve actuation system including a source of actuation fluid, and a valve housing having a longitudinal bore therethrough, and including an upstream connection, a downstream connection, and a valve positioned therebetween, wherein the valve housing is positionable on a bypass conduit downstream from a connection point with a main conduit, and wherein at least one of the valve assemblies is configured to restrict flow of a fluid in the bypass line; and a control system in electronic communication with the valve actuation system and configured to receive an electronic signal related to a fluid pressure in the main conduit, wherein the control system is configured to open the valve of either or both valve assemblies.

Aspect 2. The system according to any previous aspect, wherein the control system is configured to open the valve of either or both of the at least two valve assemblies in response to a high-pressure condition, wherein the high-pressure condition may be user defined; and/or wherein the system is configured to close the valve when the fluid pressure in the main conduit falls below a user-defined low-pressure limit.

Aspect 3. The system according to any previous aspect, further comprising a pressure sensor configured to detect the fluid pressure in the main conduit.

Aspect 4. The system according to any previous aspect, wherein the electronic signal related to the fluid pressure in the main conduit is received from the pressure sensor, from a pressure sensor on another system, from user input, or from a combination thereof.

Aspect 5. The system according to any previous aspect, wherein the control system opens the valve of at least one valve assembly upon receiving an initiation signal.

Aspect 6. The system according to any previous aspect, wherein the initiation signal is sent by a user from a remote system or input on an input device of the control system.

Aspect 7. The system according to any previous aspect, wherein the control system opens the valve of at least one valve assembly when the fluid pressure in the main conduit when signaled by the control system or by an external signal such as from a user input.

Aspect 8. The system according to any previous aspect, wherein the control system is configured to hold the valve of at least one valve assembly open for a set time period, and if, after the set time period, the fluid pressure in the main conduit is at or below the user-defined low pressure limit, the controller is configured to close the valve.

Aspect 9. The system according to any previous aspect, wherein the restricted flow of the fluid in the bypass line is produced by a flow restrictor positioned in a portion of the bypass line downstream from the at least one valve assembly.

Aspect 10. The system according to any previous aspect, wherein the restricted flow of the fluid in the bypass line is produced by a flow restrictor positioned in a portion of the bypass line upstream from the at least one valve assembly.

Aspect 11. The system according to any previous aspect, wherein the restricted flow of the fluid in the bypass line is produced by a flow restrictor in the downstream connection.

Aspect 12. The system according to any previous aspect, wherein the restricted flow of the fluid in the bypass line is produced by a flow restrictor in the upstream connection.

Aspect 13. The system according to any previous aspect, wherein the flow restrictor comprises a reduced diameter section, wherein the reduced diameter section has a diameter smaller than a diameter of the longitudinal bore of the valve housing.

Aspect 14. The system according to any previous aspect, wherein the flow restrictor comprises perforations that allow the restricted flow of the fluid to pass at a reduced flow rate.

Aspect 15. The system according to any previous aspect, wherein the flow restrictor comprises an insert positionable within the flow restrictor, wherein the insert comprises the perforations.

Aspect 16. The system according to any previous aspect, wherein the pressure sensor comprises: at least one pressure transducer positioned in a main housing of the system, and a pressure chamber having a deformable diaphragm contacting a pressure fluid within the pressure chamber, wherein the pressure fluid is fluidly connected to the at least one pressure transducer to transfer an external fluid pressure on the deformable diaphragm to the at least two pressure transducers, and wherein the pressure chamber is configured to be positioned on the main conduit line such that the fluid pressure in the main conduit line comprises the external fluid pressure on the diaphragm.

Aspect 17. The system according to any previous aspect, wherein the pressure sensor comprises: a sensor body comprising an inlet end, an outlet out, and central bore therebetween; a pressure chamber having a deformable diaphragm contacting a pressure fluid within the pressure chamber; and at least one pressure transducer fluidly connected to the pressure chamber, wherein the sensor body is positioned in-line on a conduit such the deformable diaphragm of the pressure chamber registers a fluid pressure in the conduit and transfers that fluid pressure to the at least one pressure transducer via the pressure fluid.

Aspect 18. The system according to any previous aspect, wherein the central bore of the sensor body comprises an inner wall between the inlet end and the outlet end, wherein the deformable diaphragm forms at least a portion of the inner wall.

Aspect 19. The system according to any previous aspect, wherein the deformable diaphragm forms all or a portion of an inner wall of the central bore of the sensor body.

Aspect 20. The system according to any previous aspect, wherein the pressure sensor comprises at least two pressure transducers.

Aspect 21. The system according to any previous aspect, wherein the pressure sensor comprises three pressure transducers.

Aspect 22. The system according to any previous aspect, wherein the signal indicating the fluid pressure in the main conduit is from the pressure sensor and comprises individual signals from the two or more pressure transducers, and wherein the individual signals are received at a rate of at least 50 signals/second.

Aspect 23. The system according to any previous aspect, wherein the pressure chamber is attachable on the main conduit such that the fluid pressure in the main conduit comprises the external fluid pressure on the diaphragm.

Aspect 24. The system according to any previous aspect, wherein the valve comprises a ball valve having: a ball having a throughbore, wherein an open position of the ball provides flow-through alignment of the throughbore with the upstream and downstream connections of the valve housing, and a closed position of the ball provides an out of flow-through alignment of the throughbore with the upstream and downstream connections of the valve housing, an upstream seat comprising an outward facing surface positioned perpendicular to the longitudinal bore of the valve housing, wherein a fluid pressure on the outward facing surface forces the upstream seat against a sealing face of the ball, and a downstream seat.

Aspect 25. The system according to any previous aspect, further comprising: a frame configured to contain the at least two valve assemblies, the at least one pressure transducer, and the controller.

Aspect 26. The system according to any previous aspect, wherein the valve actuation system comprises a valve actuator configured to fully open the valve in under 2 seconds, such as under 1 second.

Aspect 27. The system according to any previous aspect, wherein the valve actuation system comprises a biasing member in a valve actuation chamber which biases the valve to an open position, and wherein supply of the actuation fluid into the valve actuation chamber provides counterforce on the biasing member to move the valve to a closed position.

Aspect 28. The system according to any previous aspect, wherein the actuation system comprises a combined rotary and linear movement.

Aspect 29. The system according to any previous aspect, wherein the valve actuation system comprises a scotch yoke.

Aspect 30. The system according to any previous aspect, wherein the actuation fluid comprises a hydraulic fluid.

Aspect 31. The system according to any previous aspect, wherein the flow restrictor comprises two or more individually actuatable ports that open to provide fluid flow through the flow restrictor.

Aspect 32. The system according to any previous aspect, wherein the flow restrictor comprises two or more individually actuatable ports that open to provide fluid flow through the flow restrictor; and a hydraulic port that opens a main port to provide fluid flow that bypasses the individually actuatable ports.

Aspect 33. The system according to any previous aspect, wherein the flow restrictor allows fluid flow in either direction, wherein the fluid flow in a first direction is restricted by perforations that allow fluid to pass at a reduced flow rate, and the fluid flow in a second opposite direction is restricted by a valve plug and a spring such that fluid pressure on the valve plug forces compression of the spring and opening of the valve plug to allow fluid to flow in the second direction.

Aspect 34. A method for pressure control in a fluid line, the method comprising: providing a pressure control system according to any of one of the preceding aspects; attaching a first end of a first bypass conduit to the upstream connection of the valve housing of a first valve assembly, and a second end of the first bypass conduit to the fluid line; attaching a first end of a second bypass conduit to the downstream connection of the valve housing of the first valve assembly; attaching a pressure chamber of the pressure sensor on the fluid line such that an outward facing side of a diaphragm of the pressure sensor is in contact with a fluid in the fluid line; and setting a low-pressure limit for the first valve assembly using a user interface on the control system, wherein the control system is configured to receive an initiation signal and communicate with the valve actuation system of the first valve assembly to open the valve, and a pressure signal from the pressure sensor, such that when the pressure signal indicates that a fluid pressure in the fluid line is below the low pressure limit, the valve is closed.

Aspect 35. The method according to any previous aspect, wherein the initiation signal is sent by a user from a remote system or input on an input device of the control system.

Aspect 36. The method according to any previous aspect, the control system communicates with the valve actuation system to open the valve of the first valve assembly when the fluid pressure in the fluid line exceeds a user-defined high-pressure limit.

Aspect 37. The method according to any previous aspect, further comprising: attaching a first end of a third bypass conduit to the upstream connection of the valve housing of a second valve assembly; attaching a first end of a forth bypass conduit to the downstream connection of the valve housing of the second valve assembly; and setting a second pressure limit for the second valve assembly using the user interface on the control system, wherein the control system is configured to communicate with the valve actuation system of the second valve assembly to change a position of the valve.

Aspect 38. The method according to any previous aspect, wherein the first, second, third, and forth bypass conduits are all portions of a single bypass line having a connection to the fluid line.

Aspect 39. The method according to any previous aspect, wherein the first and second bypass conduits are portions of a first bypass line having a connection to the fluid line, and the third and fourth bypass conduits are portions of a second bypass line having a connection to a second fluid line, wherein the method further comprises: attaching a pressure chamber of a second pressure sensor on the second fluid line such that an outward facing side of a diaphragm of the second pressure sensor is in contact with a fluid in the second fluid line, wherein the control system is configured to receive a signal from the second pressure sensor indicating a fluid pressure in the second fluid line and communicate with the valve actuation system of the second valve assembly to change a position of the valve.

Aspect 40. The method according to any previous aspect, wherein the control system is configured to receive a second initiation signal and communicate with the valve actuation system of the second valve assembly to open the valve, and a pressure signal from the pressure sensor, such that when the pressure signal indicates that a fluid pressure in the fluid line is below the second pressure limit, the valve is closed.

Aspect 41. The method according to any previous aspect, wherein the initiation signal is sent by a user from a remote system or input on an input device of the control system.

Aspect 42. The method according to any previous aspect, wherein the control system communicates with the valve actuation system to open the valve of the second valve assembly when the fluid pressure in the fluid line exceeds a user-defined high-pressure limit.

Aspect 43. A flow restrictor system for pressure relief in a fluid conduit, the system comprising at least a first flow restrictor comprising: a sleeve having an inlet end, an outlet end, and a longitudinal bore therebetween; an insert positioned within the longitudinal bore and sealed against an inner wall thereof, the insert comprising a plurality of longitudinal perforations that provide fluid passage through the longitudinal bore; and a plurality of ports positioned radially through the sleeve, each port in fluid communication with one of the plurality of longitudinal perforations, wherein each port comprises an adjustable plunger configured to move within the port to adjustably restrict fluid flow through the longitudinal perforation, wherein the insert comprises a bypass port configured to provide fluid flow that bypasses the plurality of longitudinal perforations, the bypass port maintained in a closed position by a piston.

Aspect 44. The flow restrictor according to aspect 43, comprising a second flow restrictor comprising: a sleeve having an inlet end, an outlet end, and a longitudinal bore therebetween, and an insert positioned within the longitudinal bore and sealed against an inner wall thereof, the insert comprising a plurality of longitudinal perforations that provide fluid passage through the longitudinal bore, wherein the insert comprises a piston configured to restrict flow of fluid through the longitudinal bore of the second flow restrictor when in a closed position.

Aspect 45. The flow restrictor according to aspect 44, wherein the inlet end of the first flow restrictor is connectable to the outlet end of the second flow restrictor, and wherein the flow restrictor system is connectable inline on the fluid conduit.

Aspect 46. The flow restrictor according to any one of aspects 44 to 45, wherein the flow restrictor system is positioned on the fluid conduit such that fluid flow is from the inlet end of the second flow restrictor to the outlet end of the first flow restrictor.

Aspect 47. The flow restrictor according to any one of aspects 44 to 46, wherein the piston of the first and second flow restrictors is maintained in the closed position by an actuation fluid.

Aspect 48. The flow restrictor according to any one of aspects 44 to 47, wherein the piston of either or both of the first and second flow restrictor is configured to open responsive of a high-pressure condition.

Aspect 49. The flow restrictor according to any one of aspects 44 to 48, further comprising a pressure sensor configured to detect a fluid pressure in the fluid conduit.

Aspect 50. The flow restrictor according to aspect 49, wherein the piston of either or both of the first and second flow restrictor is configured to open responsive of an electronic signal indicating a high-pressure condition in the fluid conduit, wherein the electronic signal is received from the pressure sensor.

Aspect 51. The flow restrictor according to aspects 49 or 50, wherein the pressure sensor comprises at least two pressure transducers.

Aspect 52. The flow restrictor according to any one of aspects 44 to 52, wherein the insert of either or both of the first and second flow restrictors comprises an outer sleeve that seas the insert against the inner wall of the flow restrictor, and wherein the piston is positioned within the outer sleeve and maintained therein by a stop removeably positioned within the outer sleeve.

Aspect 53. The flow restrictor according to aspect 52, wherein the plurality of longitudinal perforations are positioned within the outer sleeve of the insert.

Aspect 54. The flow restrictor according to any one of aspects 44 to 53, wherein the insert of the first flow restrictor comprises an outer sleeve that seals the insert against the inner wall of the flow restrictor, and wherein the piston is positioned within the outer sleeve and maintained therein by a stop removeably positioned within the outer sleeve such that the actuation fluid fills a gap between the piston and the stop and forces the piston to close over the bypass port.

Aspect 55. The flow restrictor according to any one of aspects 44 to 54, wherein any or all of the adjustable plungers and the piston of the first flow restrictor may be automatically adjustable by a hydraulic actuator.

Aspect 56. The flow restrictor according to any one of aspects 44 to 55, wherein the adjustable plunger rotates within a bonnet to adjust a fluid flow rate through the longitudinal perforation, and the bonnet and plunger are maintained in the port by a locking nut.

Aspect 57. The flow restrictor according to any one of aspects 44 to 56, wherein each of the plurality of ports of the first flow restrictor is positioned in a section of the longitudinal bore having a reduced diameter.

Aspect 58. The flow restrictor according to any one of aspects 44 to 57, wherein each of the first and second flow restrictor comprises a section of the longitudinal bore that is distal from the inlet end and comprises a reduced diameter, wherein an end of the reduced diameter section is sealable by the piston.

Aspect 59. A relief valve (e.g., unbalanced poppet) comprising a main body having a valve head at a first axial end, and a main axial bore and a bypass axial bore therein, wherein the main axial bore has a diameter greater than a diameter of the bypass axial bore.

Aspect 60. The valve according to aspect 59, wherein fluid enters a first end of each of the main and bypass axial bores via an entry end of the relieve valve opposite the valve head, and exits the main axial bore through an exit opening on the relieve valve.

Aspect 61. The valve according to aspect 60, wherein the exit opening on the relieve valve is positioned at substantially a right angle to the entry end thereof.

Aspect 62. The valve according to aspect 60 or 61, wherein the exit opening on the relieve valve is positioned on a radial side of the relieve valve.

Aspect 63. The valve according to any one of aspects 59 to 62, wherein fluid flow through the main axial bore is obstructed by a plug positioned therein.

Aspect 64. The valve according to aspect 63, wherein the plug is maintained in a closed position over the exit opening by a spring in the valve head.

Aspect 65. The valve according to aspect 64, wherein the plug is further maintained in a closed position by fluid flow through the bypass axial bore that pressurizes a space behind the pug.

Aspect 66. The valve according to aspects 64 or 65, wherein an overpressure event forces the plug to open and allow fluid flow through the relief valve to exit from the exit opening.

While specific embodiments of the disclosure have been described in detail, it should be appreciated by those skilled in the art that various modifications and alternations and applications could be developed considering the overall teachings of the disclosure. Accordingly, the arrangements, systems, apparatuses, and methods disclosed are meant to be illustrative only and not limiting as to the scope of the disclosure. For example, while the systems and methods of the present disclosure have been described as useful for monitoring and adjusting pressure conditions of high pressure conduits, such as those used in the hydraulic fracturing industry and in wellbore completion activities, they may easily find use in other types of conduits and in other industries as would be understood by someone of ordinary skill in the art.

What is claimed is:

1. A flow restrictor system for pressure relief in a fluid conduit, the system comprising:
a first flow restrictor comprising:
a sleeve having an inlet end, an outlet end, and a longitudinal bore therebetween,
an insert positioned within the longitudinal bore and sealed against an inner wall thereof, the insert comprising a plurality of longitudinal perforations that provide fluid passage through the longitudinal bore, and
a plurality of ports positioned radially through the sleeve, each port in fluid communication with one of the plurality of longitudinal perforations, wherein each port comprises an adjustable plunger configured to move within the port to adjustably restrict fluid flow through the one of the plurality of longitudinal perforations,
wherein the insert comprises a bypass port configured to provide fluid flow that bypasses the plurality of longitudinal perforations, the bypass port is configured to be maintained in a closed configuration by a piston, and the piston is configured to open the bypass port in response to a high-pressure condition.

2. The system of claim 1, comprising a second flow restrictor comprising:
a second sleeve having a second inlet end, a second outlet end, and a second longitudinal bore therebetween, and
a second insert positioned within the second longitudinal bore and sealed against an inner wall thereof, the second insert comprising a plurality of second longitudinal perforations that provide fluid passage through the second longitudinal bore, wherein the second insert comprises a second piston configured to restrict flow of fluid through the second longitudinal bore of the second flow restrictor when in a closed configuration.

3. The system of claim 2, wherein the inlet end of the first flow restrictor is connectable to the second outlet end of the second flow restrictor, and wherein the flow restrictor system is connectable inline on the fluid conduit.

4. The system of claim 2, wherein the flow restrictor system is positioned on the fluid conduit such that fluid flow is from the second inlet end of the second flow restrictor to the outlet end of the first flow restrictor.

5. The system of claim 2, wherein the piston and the second piston are configured to be maintained in a closed position by an actuation fluid.

6. The system of claim 5, wherein the piston of the first flow restrictor is configured to open in response to a high-pressure condition, and/or the second piston of the second flow restrictor is configured to open in response to a high-pressure condition.

7. The system of claim 2, further comprising a pressure sensor configured to detect a fluid pressure in the fluid conduit, wherein the pressure sensor comprises at least two pressure transducers.

8. The system of claim 7,
wherein the piston of the first flow restrictor is configured to open in response to an electronic signal indicating a high-pressure condition in the fluid conduit, wherein the electronic signal is received from the pressure sensor, and/or
wherein the second piston of the second flow restrictor is configured to open in response to an electronic signal indicating a high-pressure condition in the fluid conduit, wherein the electronic signal is received from the pressure sensor.

9. The system of claim 2,
wherein the insert of the first flow restrictor comprises an outer sleeve that seals the insert against the inner wall of the flow restrictor, and wherein the piston is positioned within the outer sleeve and configured to be maintained therein by a stop removably positioned within the outer sleeve, and/or wherein the insert of the second flow restrictor comprises a second outer sleeve that seals the second insert against the inner wall of the second flow restrictor, and wherein the second piston is positioned within the second outer sleeve and configured to be maintained therein by a second stop removably positioned within the second outer sleeve.

10. The system of claim 9, wherein the plurality of longitudinal perforations are positioned within the outer sleeve of the insert.

11. The system of claim 2, wherein the first flow restrictor comprises a section of the longitudinal bore that is distal from the inlet end and comprises a reduced diameter, wherein an end of the reduced diameter section is sealable by the piston, and the second flow restrictor comprises a second section of the second longitudinal bore that is distal from the second inlet end and comprises a second reduced diameter, wherein a second end of the second reduced diameter section is sealable by the second piston.

12. The system of claim 1, further comprising a pressure sensor configured to detect a fluid pressure in the fluid conduit.

13. The system of claim 12, wherein the pressure sensor comprises at least two pressure transducers.

14. The system of claim 1, wherein the insert of the first flow restrictor comprises an outer sleeve that seals the insert against the inner wall of the flow restrictor, and wherein the piston is positioned within the outer sleeve and configured to be maintained therein by a stop removably positioned within the outer sleeve.

15. The system of claim 1, wherein the insert of the first flow restrictor comprises an outer sleeve that seals the insert against the inner wall of the flow restrictor, and wherein the piston is positioned within the outer sleeve and configured to be maintained therein by a stop removably positioned within the outer sleeve such that an actuation fluid fills a gap between the piston and the stop and forces the piston to close over the bypass port.

16. The system of claim 1, wherein any or all of the adjustable plungers and the piston of the first flow restrictor are automatically adjustable by a hydraulic actuator.

17. The system of claim 1, wherein the adjustable plunger rotates within a bonnet to adjust a fluid flow rate through the longitudinal perforation, and the bonnet and the adjustable plunger are configured to be maintained in the port by a locking nut.

18. The system of claim 1, wherein each of the plurality of ports of the first flow restrictor is positioned in a section of the longitudinal bore having a reduced diameter.

19. The system of claim 1, wherein the first flow restrictor comprises a section of the longitudinal bore that is distal from the inlet end and comprises a reduced diameter, wherein an end of the reduced diameter section is sealable by the piston.

20. A flow restrictor system for pressure relief in a fluid conduit, the system comprising:
a first flow restrictor comprising:
a first sleeve having a first inlet end, a first outlet end, and a first longitudinal bore therebetween,
a first insert positioned within the first longitudinal bore and sealed against an inner wall thereof, the first insert comprising a plurality of first longitudinal perforations that provide fluid passage through the first longitudinal bore, and
a plurality of ports positioned radially through the first sleeve, each port in fluid communication with one of the plurality of first longitudinal perforations, wherein each port comprises an adjustable plunger configured to move within the port to adjustably restrict fluid flow through the one of the plurality of first longitudinal perforations,
wherein the first insert comprises a bypass port configured to provide fluid flow that bypasses the plurality of first longitudinal perforations, the bypass port is configured to be maintained in a closed configuration by a first piston, and the first piston is configured to open the bypass port in response to a high-pressure condition; and
a second flow restrictor connected inline to the first flow restrictor, the second flow restrictor comprising:
a second sleeve having a second inlet end, a second outlet end, and a second longitudinal bore therebetween, and
a second insert positioned within the second longitudinal bore and sealed against an inner wall thereof, the second insert comprising a plurality of second longitudinal perforations that provide fluid passage through the second longitudinal bore, wherein the second insert comprises a second piston configured to restrict flow of fluid through the second longitudinal bore of the second flow restrictor when in a closed configuration.

* * * * *